(12) United States Patent
Nagata

(10) Patent No.: US 12,500,985 B2
(45) Date of Patent: Dec. 16, 2025

(54) DATA PROCESSING SYSTEM, MANAGEMENT DEVICE WITH FIRST RECEPTION PORT AND SECOND RECEPTION PORT, RELAY DEVICE, DEVICE TO BE MANAGED, DATA PROCESSING METHOD, AND DATA PROCESSING PROGRAM

(71) Applicant: KONICA MINOLTA INC., Tokyo (JP)

(72) Inventor: Akihiro Nagata, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 246 days.

(21) Appl. No.: 18/323,520

(22) Filed: May 25, 2023

(65) Prior Publication Data

US 2024/0022673 A1 Jan. 18, 2024

(30) Foreign Application Priority Data

Jul. 15, 2022 (JP) ................................. 2022-114015

(51) Int. Cl.
*H04N 1/00* (2006.01)
*H04N 1/32* (2006.01)
*H04N 1/44* (2006.01)

(52) U.S. Cl.
CPC ..... *H04N 1/00344* (2013.01); *H04N 1/00244* (2013.01); *H04N 1/00347* (2013.01); *H04N 1/32678* (2013.01); *H04N 1/4426* (2013.01); *H04N 2201/0094* (2013.01)

(58) Field of Classification Search
CPC ........... H04N 1/00344; H04N 1/00244; H04N 1/00347; H04N 1/32678; H04N 1/4426; H04N 2201/0094
See application file for complete search history.

(56) References Cited

U.S. PATENT DOCUMENTS 9,225,856 B2 * 12/2015 Ohara ................ H04N 1/00244
2019/0207806 A1 * 7/2019 Watanabe ................ H04B 3/36

FOREIGN PATENT DOCUMENTS

JP 2017116999 A 6/2017

\* cited by examiner

*Primary Examiner* — Kent Yip
(74) *Attorney, Agent, or Firm* — Buchanan Ingersoll & Rooney PC

(57) ABSTRACT

A data processing system includes a device to be managed, a relay device, and a management device that receives data generated by the device to be managed via the relay device, wherein the management device includes a hardware processor that: registers the relay device and the device to be managed; prepares a first port and a second port; controls the relay device to cause the device to be managed to set the second port; and, processes the data, the relay device includes a hardware processor that: transmits the data to the first port; and causes the management device to set the second port, and the device to be managed includes a hardware processor that: registers the relay device as a first destination; registers the second port as a second destination; generates data; transmits the data to the first destination; and transmits the data to the second destination.

20 Claims, 21 Drawing Sheets

DATA PROCESSING SYSTEM, MANAGEMENT DEVICE WITH FIRST RECEPTION PORT AND SECOND RECEPTION PORT, RELAY DEVICE, DEVICE TO BE MANAGED, DATA PROCESSING METHOD, AND DATA PROCESSING PROGRAM

The entire disclosure of Japanese patent Application No. 2022-114015, filed on Jul. 15, 2022, is incorporated herein by reference in its entirety.

BACKGROUND

Technological Field

The invention relates to a data processing system, a management device, a relay device, a device to be managed, a data processing method, and a data processing program, and more particularly, to a data processing system in which a device to be managed uses a service provided by a management device via a relay device, the management device, the relay device, the device to be managed, a data processing method executed in each of the management device, the relay device, and the device to be managed, and a data processing program.

Description of the Related Art

In a multifunction peripheral (hereinafter referred to as "MFP"), a system that enables use of a service provided by a service providing server connected to the Internet is known. According to this system, the user can operate the MFP to cause the service providing server to execute processing. In this system, a relay device is sometimes disposed between the MFP and the server in order to reduce loads on the MFP and the server.

For example, JP 2017-116999 A discloses that a controller of an MFP performs data communication with three cloud servers via a relay device, has a file processing function using a file storage service provided by the three cloud servers as one of executable functions, and executes standby display processing of causing a display part to display a standby screen for selecting a function to be executed from among executable functions, state determination processing of determining whether or not the file processing function is in an executable state, and error notification processing of causing an error image indicating that the file processing function cannot be executed to be displayed on the standby screen when it is determined in the state determination processing that the file processing function cannot be executed.

However, when communication is disabled due to a failure or the like of the relay device, the MFP described in JP 2017-116999 A determines that the file processing function cannot be executed, and displays an error image indicating that the file processing function cannot be executed. Therefore, when the MFP cannot communicate with the relay server, the file processing function cannot be executed even if the MFP is capable of communicating with the three cloud servers.

SUMMARY

The invention has been made to solve the above-described problem, and one object of the invention is to provide a data processing system in which a management device that receives data from a device to be managed via a relay device can receive data from the device to be managed even if the relay device stops.

Another object of the invention is to provide a management device capable of receiving data from a device to be managed even if a relay device stops in a case where data is received from the device to be managed via the relay device.

Still another object of the invention is to provide a relay device capable of transmitting data from a device to be managed to a management device even when the relay device stops.

Still another object of the invention is to provide a device to be managed capable of transmitting data to a management device even when a relay device stops.

Still another object of the invention is to provide a data processing method and a data processing program that enable a management device that receives data from a device to be managed via a relay device to receive data from the device to be managed even if the relay device stops.

To achieve at least one of the abovementioned objects, according to an aspect of the present invention, a data processing system reflecting one aspect of the present invention comprises a device to be managed, a relay device, and a management device that receives data generated by the device to be managed via the relay device, wherein the management device includes a first hardware processor that: registers a set of the relay device and the device to be managed; in response to registration of the set of the relay device and the device to be managed, prepares a first reception port via the relay device and a second reception port not via the relay device as reception windows for data generated by the device to be managed; controls the relay device to cause the device to be managed to set the second reception port; and, in response to reception of data generated by the device to be managed via the first reception port or the second reception port, processes the data, the relay device includes a second hardware processor that: in response to reception of data generated by the device to be managed, transmits the data or data obtained by processing the data to the first reception port prepared by the management device for a set of the relay device and the device to be managed; and causes the management device to set the second reception port prepared by the management device for a set of the relay device and the device to be managed, and the device to be managed includes a third hardware processor that: registers the relay device as a first transmission destination; in response to an instruction from the relay device to set the second reception port prepared by the management device for a set of the relay device and the device to be managed, registers the second reception port as a second transmission destination; generates data; transmits the generated data to the first transmission destination; and transmits the data to the second transmission destination when transmission of the data to the first transmission destination fails.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
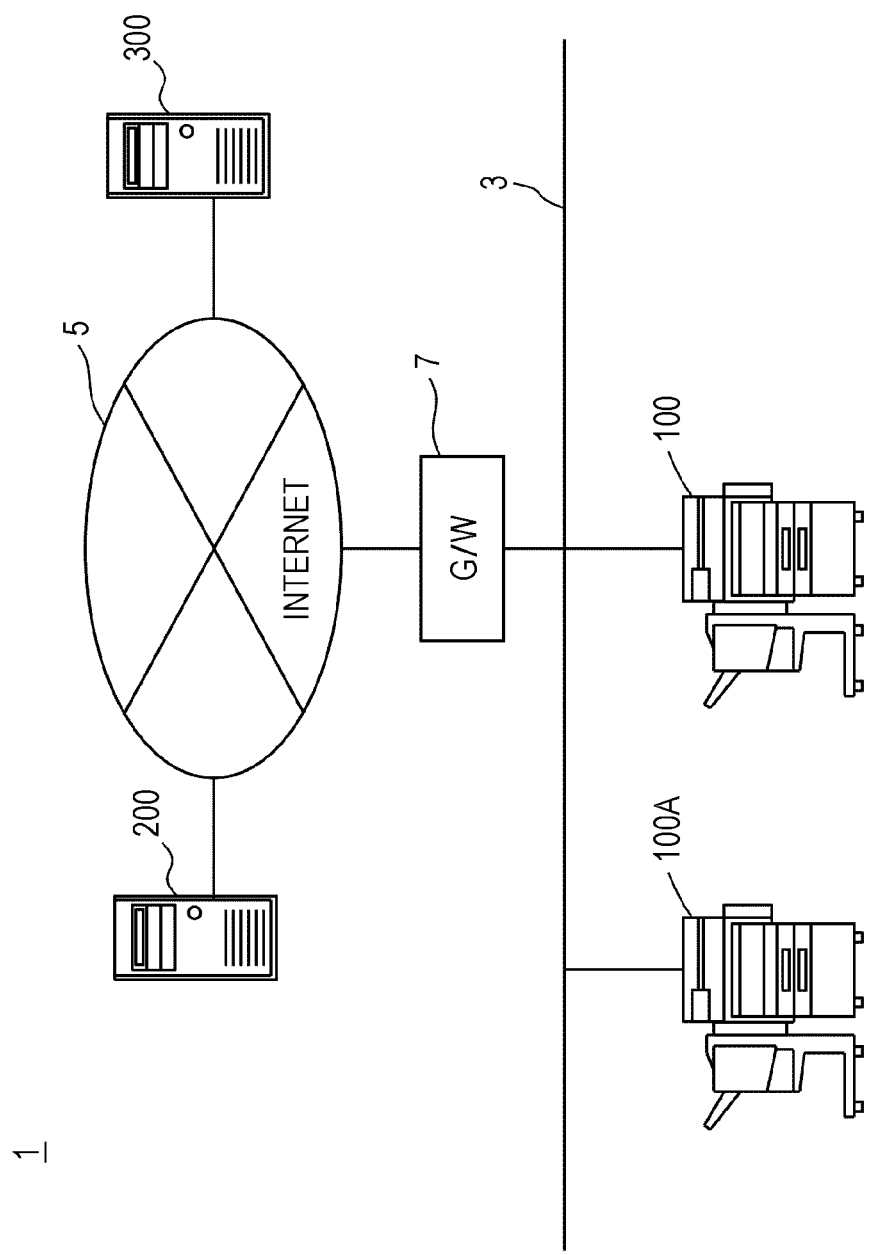
FIG. 1 is a diagram illustrating an example of an outline of a data processing system of one embodiment of the present invention.

Hereinafter, one or more embodiments of the present invention will be described with reference to the drawings. However, the scope of the invention is not limited to the disclosed embodiments. In the following description, the same components are denoted by the same reference numerals. Their names and functions are the same. Therefore, detailed descriptions thereof will not be repeated.

FIG. 1 is a diagram illustrating an example of an outline of a data processing system of one embodiment of the present invention. Referring to FIG. 1, a data processing system 1 includes multi function peripherals (MFPs) 100, 100A that function as image processing devices, a service providing server 200 that provides a service, and a relay server 300. The service providing server 200 is an example of a management device that provides a service for processing data. The MFPs 100, 100A are an example of a device to be managed that generates data to use the service provided by the service providing server 200. The relay server 300 is an example of a relay device that is disposed between the MFPs 100, 100A and the service providing server 200 and relays transmission and reception of data. The service providing server 200 receives data generated by each of the MFPs 100, 100A via the relay server 300 and processes the received data. Note that while the present embodiment illustrates an example in which the data processing system 1 includes one service providing server 200 as a management device and two MFPs 100, 100A as devices to be managed, the number of each of the management device and the device to be managed may be one or more, and the number of each component is not limited.

The service providing server 200 and the relay server 300 are connected to the Internet 5. The MFPs 100, 100A are connected to a local area network (LAN) 3. The LAN 3 is connected to the Internet 5 via a gateway device 7. Therefore, each of the MFPs 100, 100A can communicate with the service providing server 200 and the relay server 300.

The service provided by the service providing server 200 includes, but is not limited to, facsimile management processing for managing facsimile data, image processing executed on image data as a processing target, translation processing executed on character data as a processing target, voice recognition processing executed on sound data as processing data, voice synthesis processing for converting character data into voice, and the like. In addition, the service provided by the service providing server 200 includes billing processing of billing according to the usage fee of the MFP 100. Facsimile management processing is processing of accumulating facsimile data and outputting the accumulated facsimile data in response to a request. Image processing includes character recognition processing for recognizing characters in an image, color conversion processing for performing color conversion on an image, and the like. The service providing server 200 is a general computer.

The MFPs 100, 100A have the same hardware configuration and function. Therefore, here, the MFP 100 will be described as an example unless otherwise specified.

In the data processing system 1 of the present embodiment, a set of the relay server 300 and the MFP 100 is registered in the service providing server 200 in order for the service providing server 200 to process data generated by the MFP 100. The relay server 300 transmits data generated by the MFP 100 to the service providing server 200 in response to reception of the data from the MFP 100. The service providing server 200 processes data received from the relay server 300 as data received from the MFP 100.

Figure 2:
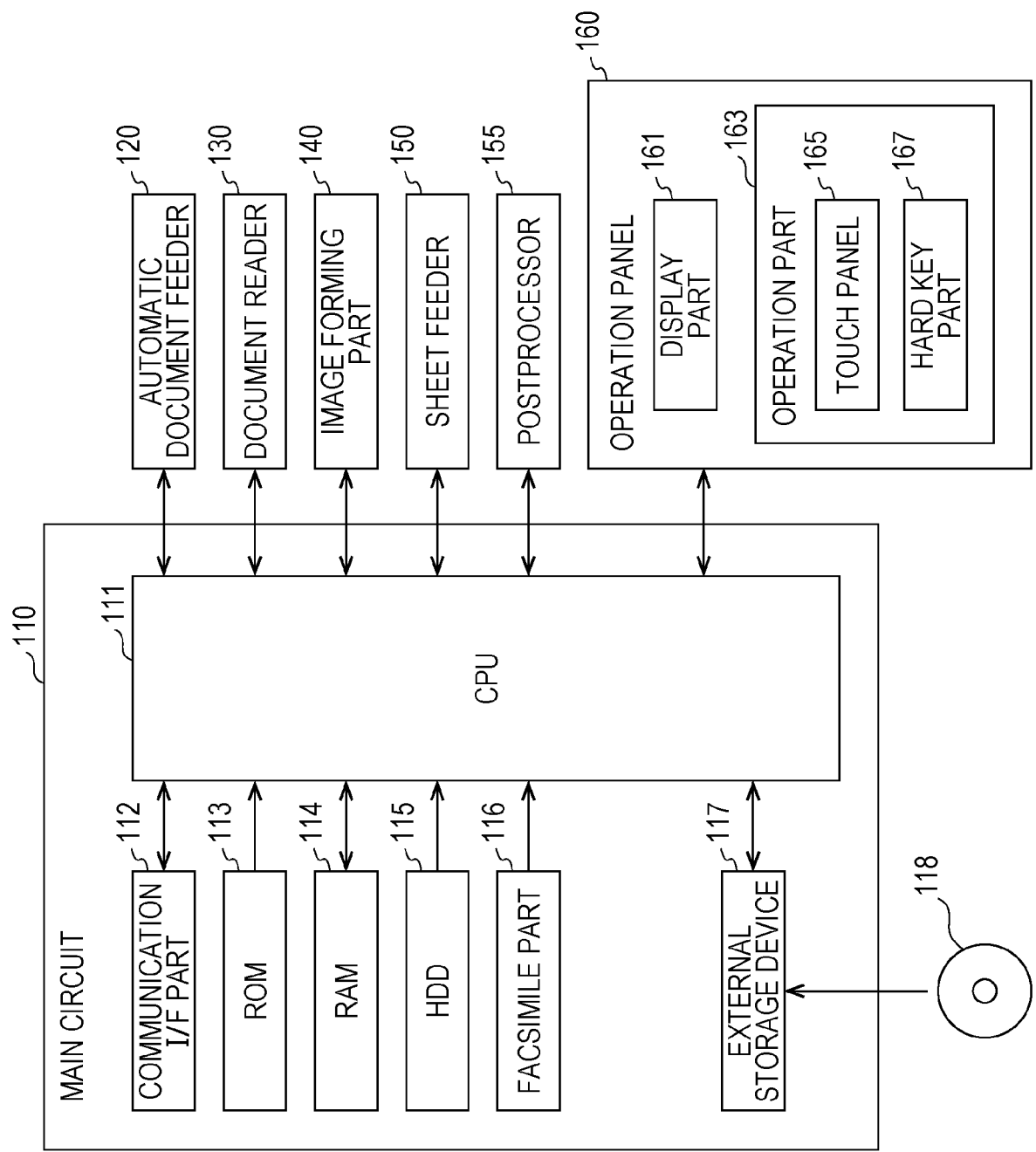
FIG. 2 is a block diagram illustrating an example of an outline of a hardware configuration of an MFP.

FIG. 2 is a block diagram illustrating an example of an outline of a hardware configuration of the MFP. Referring to FIG. 2, the MFP 100 includes a main circuit 110, a document reader 130 for reading a document, an automatic document feeder 120 for conveying a document to the document reader 130, an image forming part 140 for forming an image on a sheet or the like on the basis of image data, a sheet feeder 150 for supplying a sheet to the image forming part 140, a postprocessor 155 for processing a sheet on which an image is formed, and an operation panel 160 as a user interface.

The postprocessor 155 executes sort processing of rearranging and ejecting one or more sheets on which an image is formed by the image forming part 140, punch processing of punching holes, and staple processing of stapling.

The main circuit 110 includes a central processing unit (CPU) 111, a communication interface (I/F) part 112, a read only memory (ROM) 113 that stores a program to be executed by the CPU 111, a random access memory (RAM) 114 used as a work area of the CPU 111, a hard disk drive (HDD) 115 that stores data in a nonvolatile manner, a facsimile part 116, and an external storage device 117 on which a compact disk ROM (CD-ROM) 118 is mounted.

The CPU 111 is connected to the automatic document feeder 120, the document reader 130, the image forming part 140, the sheet feeder 150, the postprocessor 155, and the operation panel 160, and controls the entire MFP 100.

The ROM 113 stores a program executed by the CPU 111 or data necessary for executing the program. The RAM 114 is used as a work area when the CPU 111 executes a program. In addition, the RAM 114 temporarily stores read data (image data) continuously sent from the document reader 130.

The operation panel 160 is provided on an upper surface of the MFP 100 and includes a display part 161 and an operation part 163. The display part 161 is a display device such as a liquid crystal display (LCD) or an organic electroluminescence display (ELD), and displays an instruction menu for the user, information regarding acquired image data, and the like. The operation part 163 includes a hard key part 167 including a plurality of keys, and accepts input of various instructions and data such as characters and numbers by a user's operation corresponding to the keys. The operation part 163 further includes a touch panel 165 provided on the display part 161.

The communication I/F part 112 is an interface for connecting the MFP 100 to the LAN 3. The CPU 111 communicates with a device connected to the LAN 3 via the communication I/F part 112 to transmit and receive data. Further, the communication I/F part 112 can communicate with a computer connected to the Internet 5 such as the service providing server 200 via the gateway device 7.

The facsimile part 116 is connected to the public switched telephone network (PSTN) and transmits facsimile data to the PSTN or receives facsimile data from the PSTN. The facsimile part 116 stores the received facsimile data in the HDD 115 or outputs the facsimile data to the image forming part 140. The image forming part 140 prints the facsimile data received by the facsimile part 116 on a sheet. In addition, the facsimile part 116 converts data stored in the HDD 115 into facsimile data and transmits the facsimile data to a facsimile device connected to the PSTN.

The CD-ROM 118 is mounted on the external storage device 117. The CPU 111 can access the CD-ROM 118 via the external storage device 117. The CPU 111 loads the program recorded in the CD-ROM 118 mounted on the external storage device 117 into the RAM 114 and executes the program. Note that a medium that stores the program executed by the CPU 111 is not limited to the CD-ROM 118, and may be an optical disk (magnetic optical disc (MO)/mini disc (MD)/digital versatile disc (DVD)), an IC card, an optical card, or a semiconductor memory such as a mask ROM or an erasable programmable ROM (EPROM).

In addition, the CPU 111 may load a program stored in the HDD 115 into the RAM 114 and execute the program. In this case, another computer connected to the LAN 3 or the Internet 5 may rewrite the program stored in the HDD 115 of the MFP 100 or add and write a new program. Further, the MFP 100 may download a program from another computer connected to the LAN 3 or the Internet 5 and store the program in the HDD 115. The program here includes not only a program that can be directly executed by the CPU 111 but also a source program, a compressed program, an encrypted program, and the like.

Figure 3:
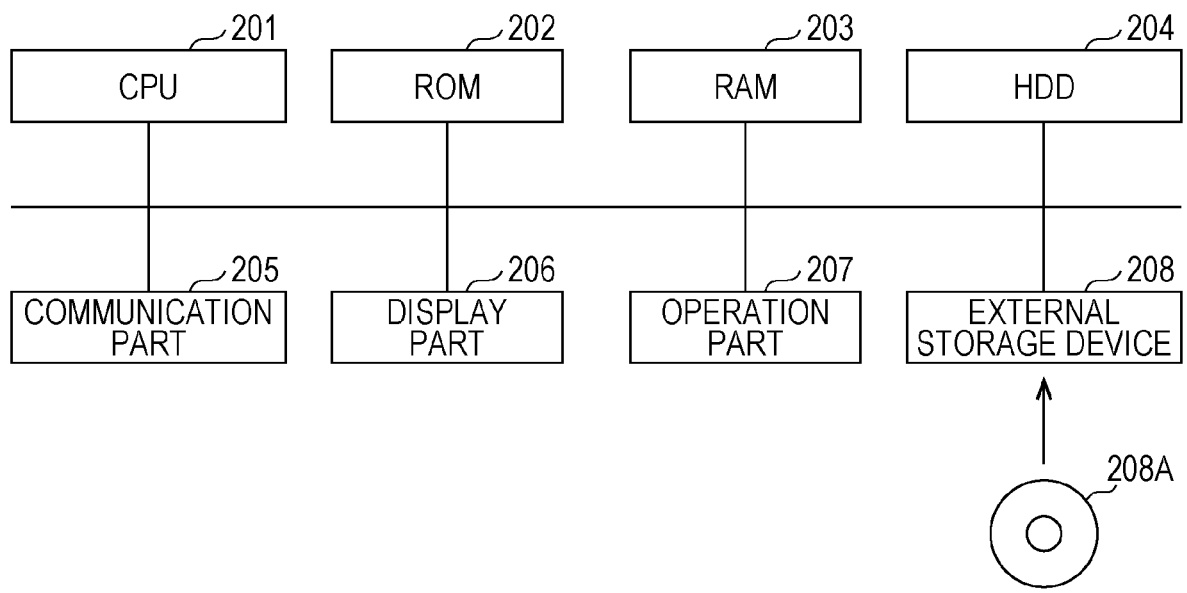
FIG. 3 is a block diagram illustrating an example of an outline of a hardware configuration of a service providing server of the present embodiment.

FIG. 3 is a block diagram illustrating an example of an outline of a hardware configuration of the service providing server of the present embodiment. Referring to FIG. 3, the service providing server 200 includes a central processing unit (CPU) 201 for controlling the entire service providing server 200, a ROM 202 that stores a program to be executed by the CPU 201, a RAM 203 that is used as a work area of the CPU 201, a hard disk drive (HDD) 204 that stores data in a nonvolatile manner, a communication part 205 that connects the CPU 201 to the Internet 5, a display part 206 that displays information, an operation part 207 that accepts input of a user's operation, and an external storage device 208 on which a CD-ROM 208A is mounted.

The external storage device 208 can be mounted with the CD-ROM 208A storing a data processing program. The CPU 201 can access the CD-ROM 208A via the external storage device 208. The CPU 201 can load the data processing program recorded in the CD-ROM 208A mounted on the external storage device 208 into the RAM 203 and execute the program.

Note that the medium that stores the program executed by the CPU 201 is not limited to the CD-ROM 208A, and may be an optical disk, an IC card, an optical card, or a semiconductor memory.

In addition, the program executed by the CPU 201 is not limited to the program recorded in the CD-ROM 208A, and a program stored in the HDD 204 may be loaded into the RAM 203 and executed. In this case, another computer connected to the Internet 5 may rewrite the program stored in the HDD 204 of the service providing server 200 or add and write a new program. Further, the service providing server 200 may download a program from another computer connected to the Internet 5 and store the program in the HDD 204. The program here includes not only a program that can be directly executed by the CPU 201 but also a source program, a compressed program, an encrypted program, and the like.

Figure 4:
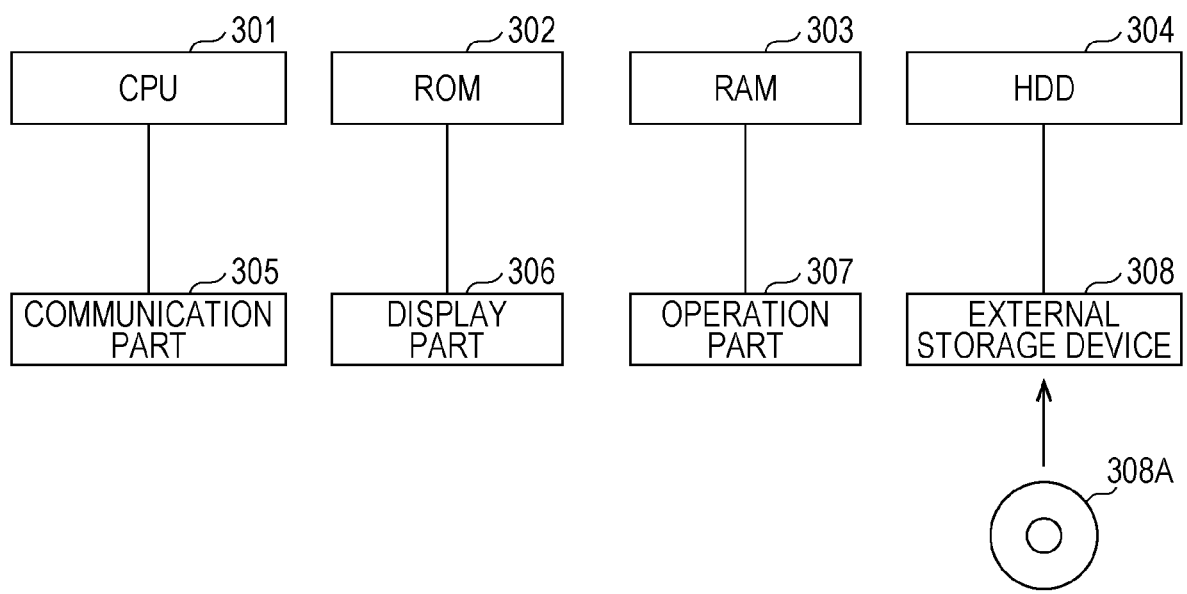
FIG. 4 is a block diagram illustrating an example of an outline of a hardware configuration of a relay server of the present embodiment.

FIG. 4 is a block diagram illustrating an example of an outline of a hardware configuration of the relay server of the present embodiment. Referring to FIG. 4, the relay server 300 includes a central processing unit (CPU) 301 for controlling the entire relay server 300, a ROM 302 that stores a program to be executed by the CPU 301, a RAM 303 that is used as a work area of the CPU 301, a hard disk drive (HDD) 304 that stores data in a nonvolatile manner, a communication part 305 that connects the CPU 301 to the Internet 5, a display part 306 that displays information, an operation part 307 that accepts input of a user's operation, and an external storage device 308 mounted with a CD-ROM 308A.

The external storage device 308 can be mounted with the CD-ROM 308A storing a data processing program. The CPU 301 can access the CD-ROM 308A via the external storage device 308. The CPU 301 can load the data processing program recorded in the CD-ROM 308A mounted on the external storage device 308 into the RAM 303 and execute the program.

Note that the medium that stores the program executed by the CPU 301 is not limited to the CD-ROM 308A, and may be an optical disk, an IC card, an optical card, or a semiconductor memory.

In addition, the program executed by the CPU 301 is not limited to the program recorded in the CD-ROM 308A, and a program stored in the HDD 304 may be loaded into the RAM 303 and executed. In this case, another computer connected to the Internet 5 may rewrite the program stored in the HDD 304 of the relay server 300 or add and write a new program. Further, the relay server 300 may download a program from another computer connected to the Internet 5 and store the program in the HDD 304. The program here includes not only a program that can be directly executed by the CPU 301 but also a source program, a compressed program, an encrypted program, and the like.

Figure 5:
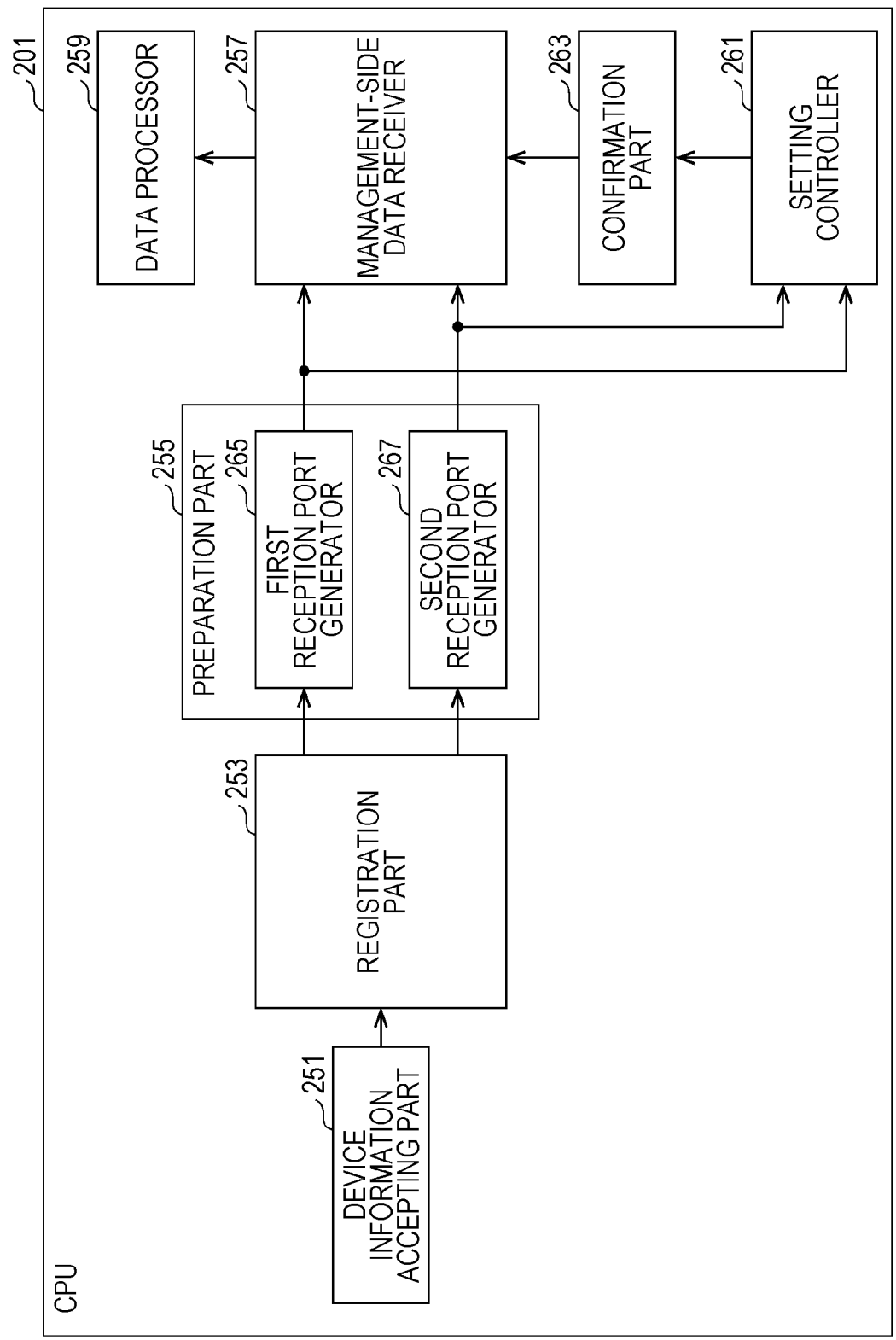
FIG. 5 is a diagram illustrating an example of functions of a CPU included in the service providing server.

FIG. 5 is a diagram illustrating an example of functions of the CPU included in the service providing server. The functions illustrated in FIG. 5 are functions implemented by the CPU 201 when the CPU 201 included in the service providing server 200 executes a service providing program stored in the ROM 202, the RAM 203, the HDD 204, or the CD-ROM 208A. The service providing program is a part of the data processing program.

Referring to FIG. 5, the CPU 201 included in the service providing server 200 includes a device information accepting part 251, a registration part 253, a preparation part 255, a management-side data receiver 257, a data processor 259, a setting controller 261, and a confirmation part 263.

The device information accepting part 251 accepts a registration operation for registering a relay device and a device to be managed. A device to be managed is a device that generates data to be subjected to data processing defined as a service provided by the service providing server 200. Here, a case where the MFP 100 is a device to be managed will be described as an example. A relay device is a device that relays transmission and reception of data between the MFP 100 and the service providing server 200. Here, a case where the relay server 300 is a relay device will be described as an example.

For example, when the administrator of the MFP 100 logs in to the service providing server 200, the device information accepting part 251 displays a device registration screen on a terminal device operated by the administrator. The device registration screen includes an area for inputting device identification information for identifying a device to be managed and an area for inputting device identification information for identifying a relay device. The device identification information is, but not limited to, a network address such as an internet protocol (IP) address. The device information accepting part 251 outputs device identification information of each of the device to be managed and the relay device to the registration part 253. Here, device identification information of the MFP 100 and device identification information of the relay server 300 input by the administrator to the device registration screen are output to the registration part 253.

The registration part 253 receives the device identification information of each of the MFP 100 and the relay server 300 from the device information accepting part 251. The registration part 253 registers a set of the MFP 100 and the relay server 300. The registration part generates a registration record including the device identification information of the MFP 100 and the device identification information of the relay server 300, and adds the registration record to a registration table prepared in advance corresponding to the service. The registration table is a table stored in the HDD 204. As a result, in the service providing server 200, the device to be managed is associated with a service, and the device to be managed is associated with the relay device. Here, the MFP 100 is associated with a service, and the MFP 100 and the relay server 300 are associated with each other. The registration part 253 outputs the registration record to the preparation part 255.

The preparation part 255 includes a first reception port generator 265 and a second reception port generator 267. In response to input of the registration record, the first reception port generator 265 generates a first reception port that is a reception window for receiving data generated by the device to be managed from the relay device. The first reception port is information indicating a position on the network. For example, a uniform resource locator (URL) may be used as the first reception port. The first reception port generator 265 outputs a set of a registration record and the first reception port to the management-side data receiver 257 and the setting controller 261.

In response to input of the registration record, the second reception port generator 267 generates a second reception port that is a reception window for receiving data generated by the device to be managed from the device to be managed. The second reception port is identified by position information indicating a position on the network. For example, a URL may be used as the position information indicating the second reception port. The second reception port is a reception window different from the first reception port. The second reception port generator 267 outputs a set of a registration record and the second reception port to the management-side data receiver 257 and the setting controller 261.

The management-side data receiver 257 receives data at the first reception port after the set of the registration record and the first reception port is input from the first reception port generator 265. The management-side data receiver 257 identifies the device to be managed and the relay device corresponding to the first reception port on the basis of the registration record. The first reception port is a reception port effective only for communication with the relay device. In addition, data received by the first reception port is treated as data generated by the device to be managed. Therefore, in the management-side data receiver 257, the first reception port receives only data transmitted from the relay device identified on the basis of the registration record. In addition, the management-side data receiver 257 treats data received from the relay device at the first reception port as data generated in the device to be managed identified on the basis of the registration record. Specifically, the management-side data receiver 257 outputs a set of data received by the first reception port and device identification information of the device to be managed to the data processor 259.

In response to input of a set of data and device identification information of a device to be managed, the data processor 259 uses the data to execute processing defined in a service corresponding to the device to be managed. For example, when the processing defined by the service corresponding to the device to be managed is facsimile management processing and the data is facsimile data, the data processor 259 stores the facsimile data in the HDD 204 and executes processing of outputting the facsimile data in response to a request from the outside.

In response to input of the set of the registration record and the second reception port from the second reception port generator 267, the setting controller 261 sets the second reception port in the device to be managed identified by the registration record. Details of the setting controller 261 will be described later. The setting controller 261 outputs the registration record to the confirmation part 263.

The confirmation part 263 determines whether or not the relay device identified by the registration record is functioning, and outputs a signal indicating whether or not the relay device is functioning to the management-side data receiver 257. The confirmation part 263 attempts communication with the relay device identified by the registration record, determines that the relay device is functioning in a case where communication with the relay device is possible, and determines that the relay device is not functioning in a case where communication with the relay device is not possible.

The management-side data receiver 257 receives data at the second reception port after the set of the registration record and the second reception port is input from the second reception port generator 267. The management-side data receiver 257 receives data at the second reception port when a signal indicating that the relay device is not functioning is input from the confirmation part 263, but does not receive data at the second reception port when a signal indicating that the relay device is functioning is input from the confirmation part 263. The management-side data receiver 257 receives data only at the first reception port while the relay device is functioning.

The management-side data receiver 257 identifies the device to be managed corresponding to the second reception port on the basis of the registration record. The second reception port is a reception window effective only for communication with the device to be managed. In addition, the data received by the second reception port is treated as data generated by the device to be managed. Therefore, in the management-side data receiver 257, the second reception port receives only data transmitted from the device to be managed identified on the basis of the registration record. In addition, the management-side data receiver 257 treats data received from the device to be managed at the second reception port as data generated in the device to be managed. Specifically, the management-side data receiver 257 outputs a set of data received by the second reception port and device identification information of the device to be managed to the data processor 259.

Figure 6:
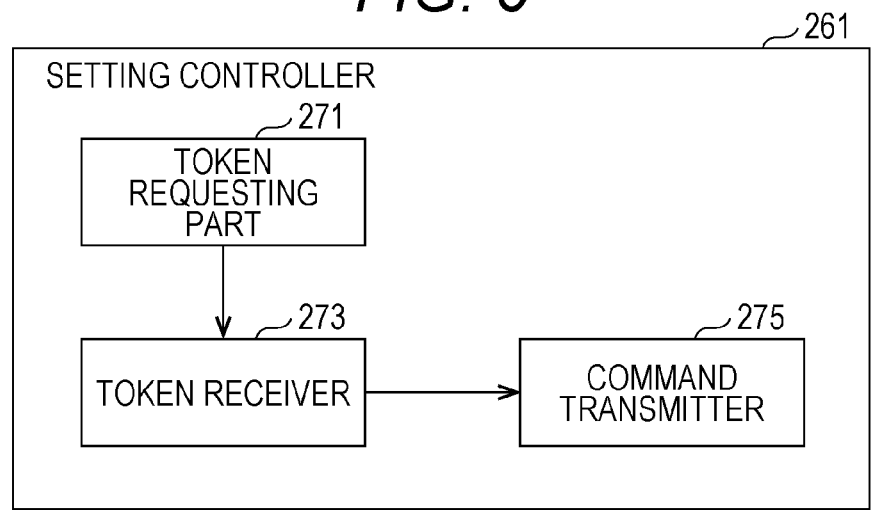
FIG. 6 is a block diagram illustrating an example of functions of a setting controller.

FIG. 6 is a block diagram illustrating an example of functions of the setting controller. Referring to FIG. 6, the setting controller 261 includes a token requesting part 271 and a token receiver 273. The setting controller 261 receives a set of a registration record and the first reception port from the first reception port generator 265, and receives a set of a registration record and the second reception port from the second reception port generator 267.

The token requesting part 271 requests the relay device identified by the registration record to issue a token. For example, the token requesting part 271 requests issuance of a token by transmitting a token request command to the relay device. The token may be an authentication token or an authorization token. When requesting issuance of a token, the token requesting part 271 transmits a token request command including position information indicating the second reception port and device identification information of the device to be managed in the request. The token request command is transmitted, for example, when an administrator who manages the MFP 100 logs in to the relay device while logging in to the service providing server 200. In this case, the relay device returns an authentication screen to the service providing server 200 in response to reception of the token request command. When the administrator inputs authentication information according to the authentication screen, authentication of the administrator succeeds in the relay device. When the authentication of the administrator is successful, the relay device issues a token and returns the token to the service providing server 200. The token receiver 273 receives the token issued by the relay device. The token receiver 273 outputs the token to a command transmitter 275.

The command transmitter 275 transmits a first setting control command to the relay device using the token received by the token receiver 273. Specifically, the token received by the token receiver 273 is transmitted together with the first setting control command. The first setting control command is, for example, an API command that causes the relay device to execute predetermined processing. The first setting control command transmitted here is a command for setting the first reception port which is a window for data generated by the device to be managed. The first setting control command includes device identification information of the device to be managed and position information indicating the first reception port.

Figure 7:
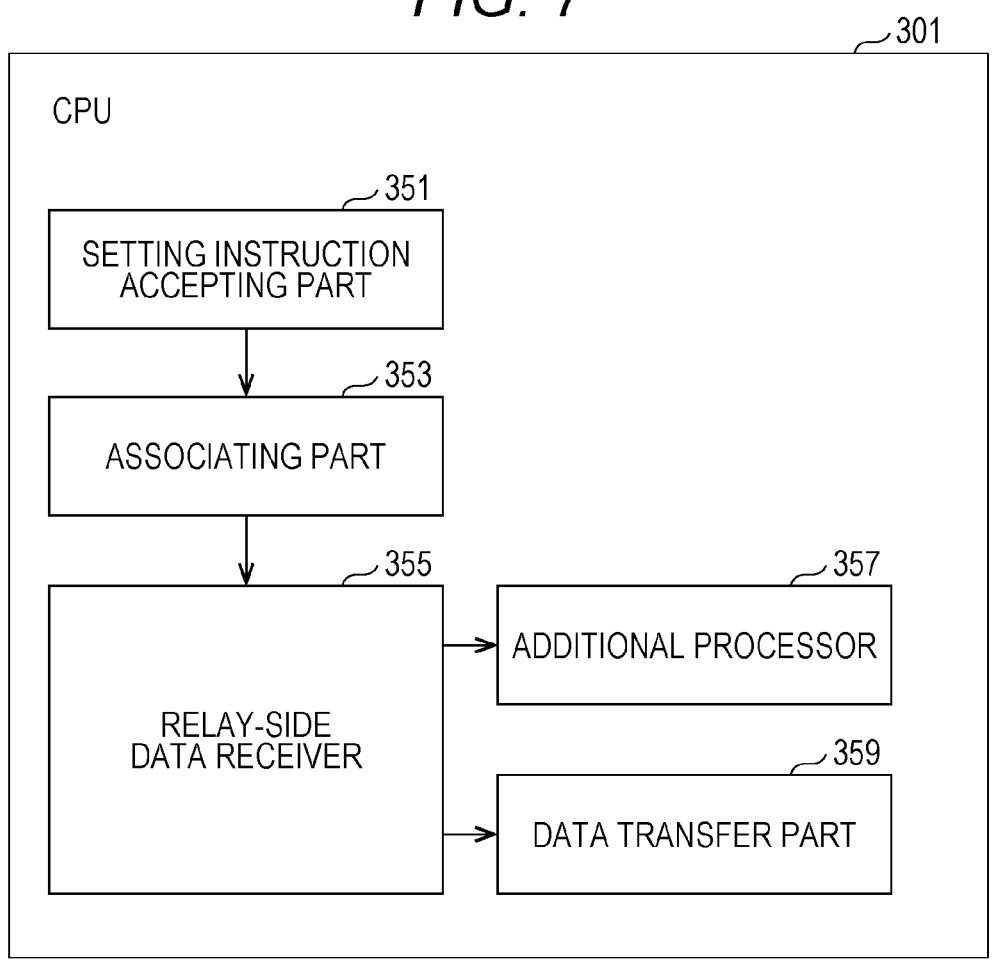
FIG. 7 is a block diagram illustrating an example of functions of a CPU included in the relay server.

FIG. 7 is a block diagram illustrating an example of functions of the CPU included in the relay server. The functions illustrated in FIG. 7 are functions implemented by the CPU 301 when the CPU 301 included in the relay server 300 executes a relay program stored in the ROM 302, the RAM 303, the HDD 304, or the CD-ROM 308A. The relay program is a part of the data processing program.

Referring to FIG. 7, the CPU 301 included in the relay server 300 includes a setting instruction accepting part 351, an associating part 353, a relay-side data receiver 355, an additional processor 357, and a data transfer part 359.

Figure 8:
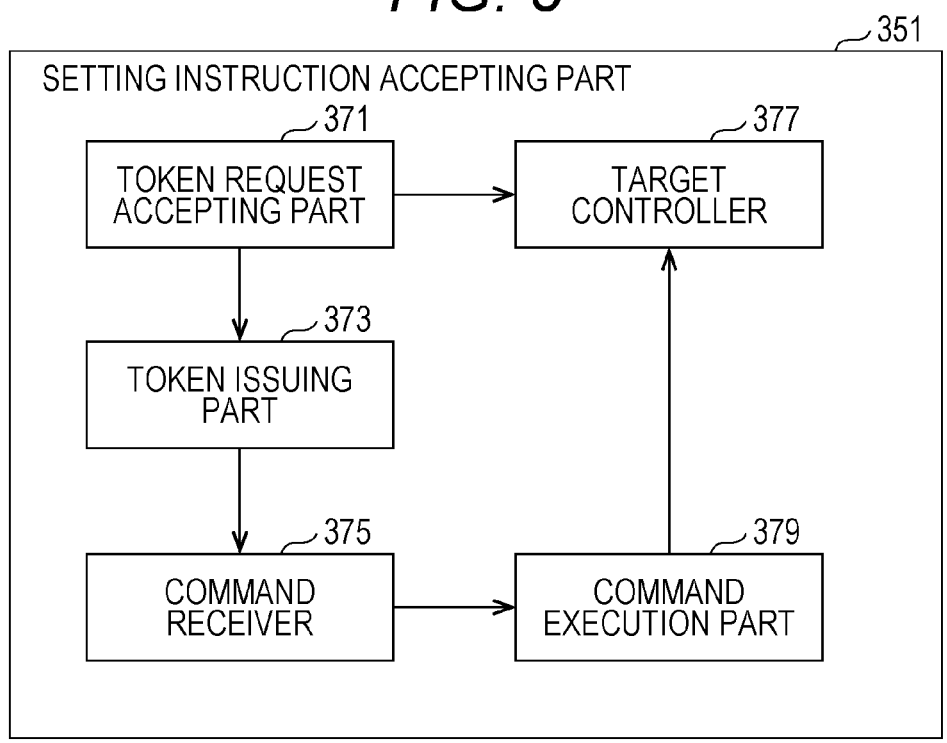
FIG. 8 is a block diagram illustrating an example of detailed functions of a setting instruction accepting part.

FIG. 8 is a block diagram illustrating an example of detailed functions of the setting instruction accepting part. Referring to FIG. 8, the setting instruction accepting part 351 includes a token request accepting part 371, a token issuing part 373, a command receiver 375, a target controller 377, and a command execution part 379. The token request accepting part 371 accepts a token issue request from the service providing server 200. For example, when the administrator of the MFP 100 logs in to the relay device while logging in to the service providing server 200, a token request command is transmitted from the service providing server 200. In response to receiving the token request command from the service providing server 200, the token request accepting part 371 transmits an authentication screen to the service providing server 200. When the administrator inputs authentication information according to the authentication screen, the token request accepting part 371 determines whether or not the administrator is an authentic user registered in advance in the relay server 300 on the basis of the authentication information. When determining that the administrator is an authentic user, the token request accepting part 371 authenticates the administrator, outputs an issue instruction to the token issuing part 373, and outputs a second setting instruction to the target controller 377. The second setting instruction includes position information indicating the second reception port and device identification information of the device to be managed included in the token request command.

In response to input of the second setting instruction from the token request accepting part 371, the target controller 377 controls the device to be managed and causes the device to be managed to set the second reception port. The target controller 377 identifies the device to be managed from the device identification information included in the second setting instruction, and transmits a second setting command for causing the device to be managed to set the second reception port. The second setting command is an API command prepared by the device to be managed. As a result, the second reception port is set in the device to be managed.

Note that the administrator may operate the device to be managed to set the second reception port.

The token issuing part 373 issues a token in response to input of an issue instruction. The token issuing part 373 transmits the issued token to the service providing server 200 and outputs the token to the command receiver 375.

The command receiver 375 receives the first setting control command received together with the token. The first setting control command received by the command receiver 375 is a command for setting the first reception port which is a window for data generated by the device to be managed. The command receiver 375 outputs the received first setting control command to the command execution part 379.

The command execution part 379 outputs an association instruction including a set of device identification information of the device to be managed and position information indicating the first reception port included in the first setting control command to the associating part 353, and outputs a first setting instruction to the target controller 377. The first setting instruction includes device identification information of the device to be managed included in the first setting control command and transmission destination information indicating a data transmission destination. Transmission destination information includes a network address of a relay device.

In response to input of the first setting instruction from the command execution part 379, the target controller 377 controls the device to be managed and causes the device to be managed to set the relay server 300 as the data transmission destination. The target controller 377 identifies the device to be managed from the device identification information included in the first setting instruction, and transmits the second setting command to the device to be managed. The second setting command is a command for causing the device to be managed to set the transmission destination identified by the transmission destination information, and is an API command prepared by the device to be managed. As a result, the data transmission destination is set in the device to be managed. Note that the administrator may operate the device to be managed to set the data transmission destination.

Returning to FIG. 7, in response to input of the association instruction from the setting instruction accepting part 351, the associating part 353 associates the device identification information of the device to be managed with the first reception port. For example, the associating part 353 stores a set of device identification information of the device to be managed and position information indicating the first reception port in the HDD 304.

The relay-side data receiver 355 extracts data received from the device to be managed from data received by the communication part 305. The relay-side data receiver 355 identifies the device to be managed associated with the first reception port by the associating part 353. The relay-side data receiver 355 outputs data from the identified device to be managed received by the communication part 305 to the additional processor 357 and the data transfer part 359.

When there is additional processing determined in advance with the device to be managed, the additional processor 357 executes the predetermined additional processing on data input from the relay-side data receiver 355. The additional processing includes, but is not limited to, for example, extraction processing of extracting a page of a cover from facsimile data, compression processing of compressing data of the cover, generation processing of generating an e-mail to which compressed data is attached, and e-mail transmission processing of transmitting the generated e-mail.

The data transfer part 359 transfers the data input from the relay-side data receiver 355 to the first reception port. The first reception port is identified by a network address of the management device.

Figure 9:
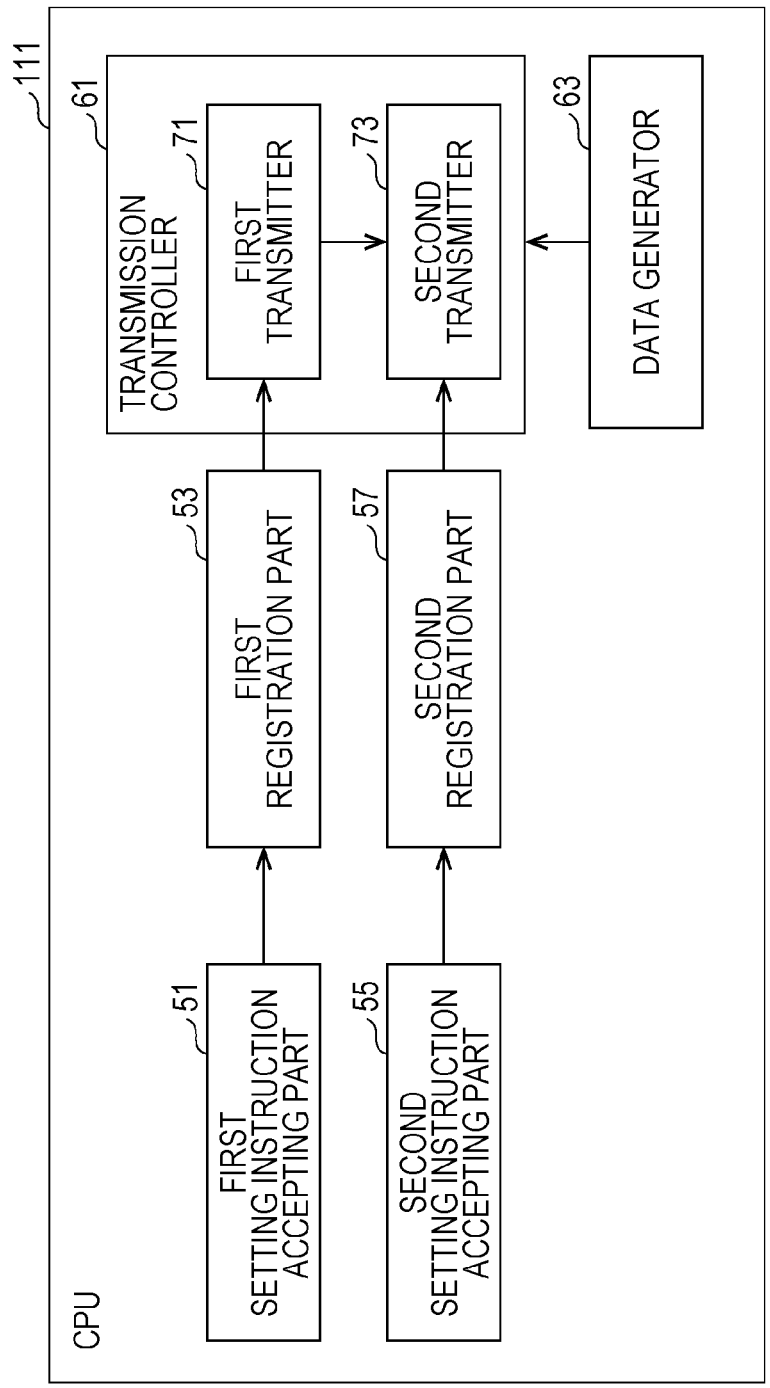
FIG. 9 is a block diagram illustrating an example of functions of a CPU included in the MFP.

FIG. 9 is a block diagram illustrating an example of functions of a CPU included in the MFP. The functions illustrated in FIG. 9 are functions implemented by the CPU 111 when the CPU 111 included in the MFP 100 executes a data generation program stored in the ROM 113, the RAM 114, the HDD 115, or the CD-ROM 118. The data generation program is a part of the data processing program.

Referring to FIG. 9, the CPU 111 included in the MFP 100 includes a first setting instruction accepting part 51, a first registration part 53, a second setting instruction accepting part 55, a second registration part 57, a data generator 63, and a transmission controller 61.

In response to reception of the first setting command from the relay device, the first setting instruction accepting part 51 outputs transmission destination information included in a first setting command to the first registration part 53. The first registration part 53 registers the transmission destination information as the data transmission destination.

In response to reception of the second setting command from the relay device, the second setting instruction accepting part 55 outputs position information indicating the second reception port included in the second setting command to the second registration part 57. The second registration part 57 registers the second reception port as the data transmission destination.

The data generator 63 generates data to be processed corresponding to a service provided by the management device. Here, when the MFP 100 receives facsimile data received from the outside, the facsimile data is data to be processed. The data generator 63 outputs the facsimile data received from the outside to the transmission controller 61.

The transmission controller 61 transmits the data input from the data generator 63. The transmission controller 61 includes a first transmitter 71 and a second transmitter 73. The first transmitter 71 transmits data input from the data generator 63 to a transmission destination identified by transmission destination information registered by the first registration part 53. Since transmission destination information includes the network address of the relay device, the first transmitter 71 transmits data to the relay device. When failing to transmit data to the relay device, the first transmitter 71 outputs a transmission instruction to the second transmitter 73.

In response to input of the transmission instruction from the first transmitter 71, the second transmitter 73 transmits the data input from the data generator 63 to the second reception port registered by the second registration part 57.

Figure 10:
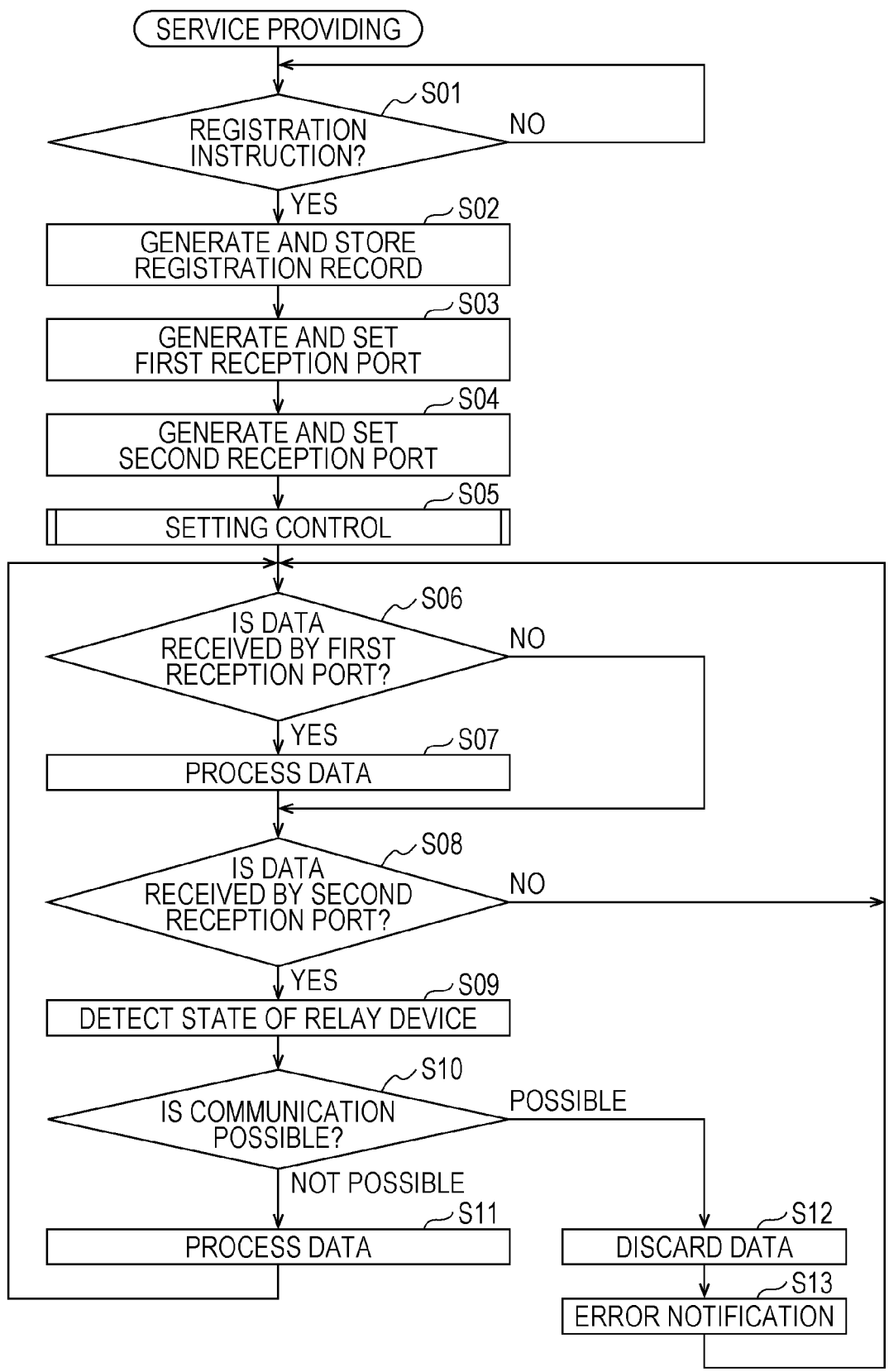
FIG. 10 is a flowchart illustrating an example of a flow of service providing processing.

FIG. 10 is a flowchart illustrating an example of a flow of service providing processing. Service providing processing is processing executed by the CPU 201 when the CPU 201 included in the service providing server 200 executes a service providing program stored in the ROM 202, the RAM 203, the HDD 204, or the CD-ROM 208A.

Referring to FIG. 10, the CPU 201 included in the service providing server 200 determines whether or not a registration instruction is accepted (step S01). For example, when the administrator of the MFP 100 logs in to the service providing server 200 and inputs a registration instruction, the registration instruction is accepted. Specifically, when the administrator of the MFP 100 logs in to the service providing server 200, a device registration screen is displayed on a terminal device operated by the administrator. The device registration screen includes an area for inputting device identification information for identifying a device to be managed and an area for inputting device identification information for identifying a relay device. When device identification information of each of a device to be managed and a relay device is accepted, registration instruction is accepted. The processing is in a standby state until a registration instruction is accepted (NO in step S01), and when a registration instruction is accepted (YES in step S01), the processing proceeds to step S02.

In step S02, a registration record is generated and stored. A registration record including device identification information of the device to be managed and device identification information of the relay device is generated, and the registration record is added to a registration table prepared in advance corresponding to the service. The registration table is a table stored in the HDD 204.

In the next step S03, the first reception port is generated and set. The first reception port is a reception window for receiving data generated by the device to be managed from the relay device. The first reception port is identified by a network address. The first reception port is set such that data transmitted from the relay device can be received by the first reception port.

In the next step S04, the second reception port is generated and set. The second reception port is a reception window for receiving data generated by the device to be managed from the device to be managed. The second reception port is identified by a network address. The second reception port is a reception window different from the first reception port. The second reception port is set such that data transmitted from the device to be managed can be received by the second reception port.

In the next step S05, setting control processing is executed, and the processing proceeds to step S06.

Figure 11:
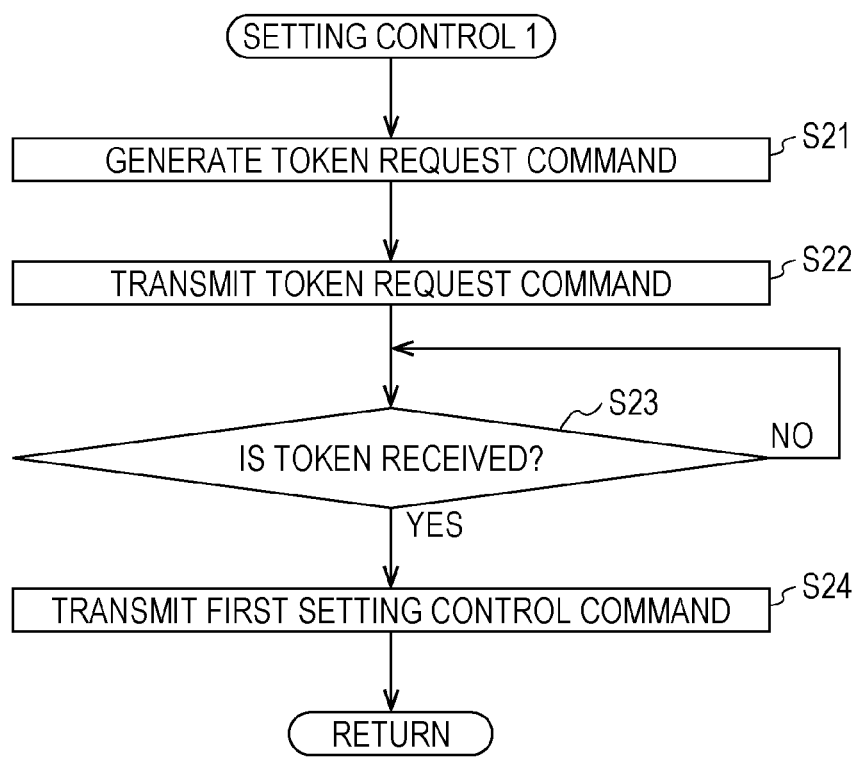
FIG. 11 is a flowchart illustrating an example of a flow of setting control processing.

FIG. 11 is a flowchart illustrating an example of a flow of setting control processing. Referring to FIG. 11, a token request command is generated (step S21), and the processing proceeds to step S22. Position information indicating the second reception port generated in step S04 of the service providing processing and device identification information of the device to be managed are added to the token request command. Note that the token here may be an authentication token or an authorization token.

In step S22, the token request command is transmitted to the relay device, and the processing proceeds to step S23. The relay device is identified by a registration record. The token request command is transmitted, for example, when the administrator who manages the MFP 100 executes processing of logging in to the relay server 300 from the service providing server 200 while logging in to the service providing server 200.

In step S23, it is determined whether or not a token is received. The processing is in a standby state until a token is received from the relay device (NO in step S23), and when a token is received (YES in step S23), the processing proceeds to step S24.

In step S24, the first setting control command is transmitted to the relay device using the token received in step S23, and the processing returns to the service providing processing. The first setting control command is, for example, an API command for causing the relay device to execute predetermined processing, and is a command for setting the first reception port which is a window for data generated by the device to be managed. The first setting control command includes device identification information of the device to be managed and position information indicating the first reception port.

Returning to FIG. 10, in step S06, it is determined whether or not data is received by the first reception port. The first reception port is a window through which communication can be performed only with the relay device. If data is received by the first reception port, the processing proceeds to step S07, and if not, the processing proceeds to step S08.

In step S07, the data received in step S06 is processed, and the processing proceeds to step S08. Processing defined for the service defined for the device to be managed is executed on the data.

In step S08, it is determined whether or not data is received by the second reception port. The second reception port is a window through which communication can be performed only with the device to be managed. If data is received by the second reception port, the processing proceeds to step S09, and if not, the processing returns to step S06.

In step S09, the state of the relay device is detected. Communication with the relay device is attempted, and whether or not communication is possible is detected. In the next step S10, the processing branches depending on the state of the relay device. If the relay device cannot communicate, the processing proceeds to step S11, and if it can, the processing proceeds to step S12.

In step S11, the data received by the second reception port in step S08 is processed, and the process returns to step S06. Processing defined for the service defined for the device to be managed is executed on the data.

On the other hand, in step S12, the data received by the second reception port in step S08 is discarded, and the processing proceeds to step S13. In step S13, the device to be managed that has transmitted the data to the second reception port is notified of an error, and the processing returns to step S06.

Figure 12:
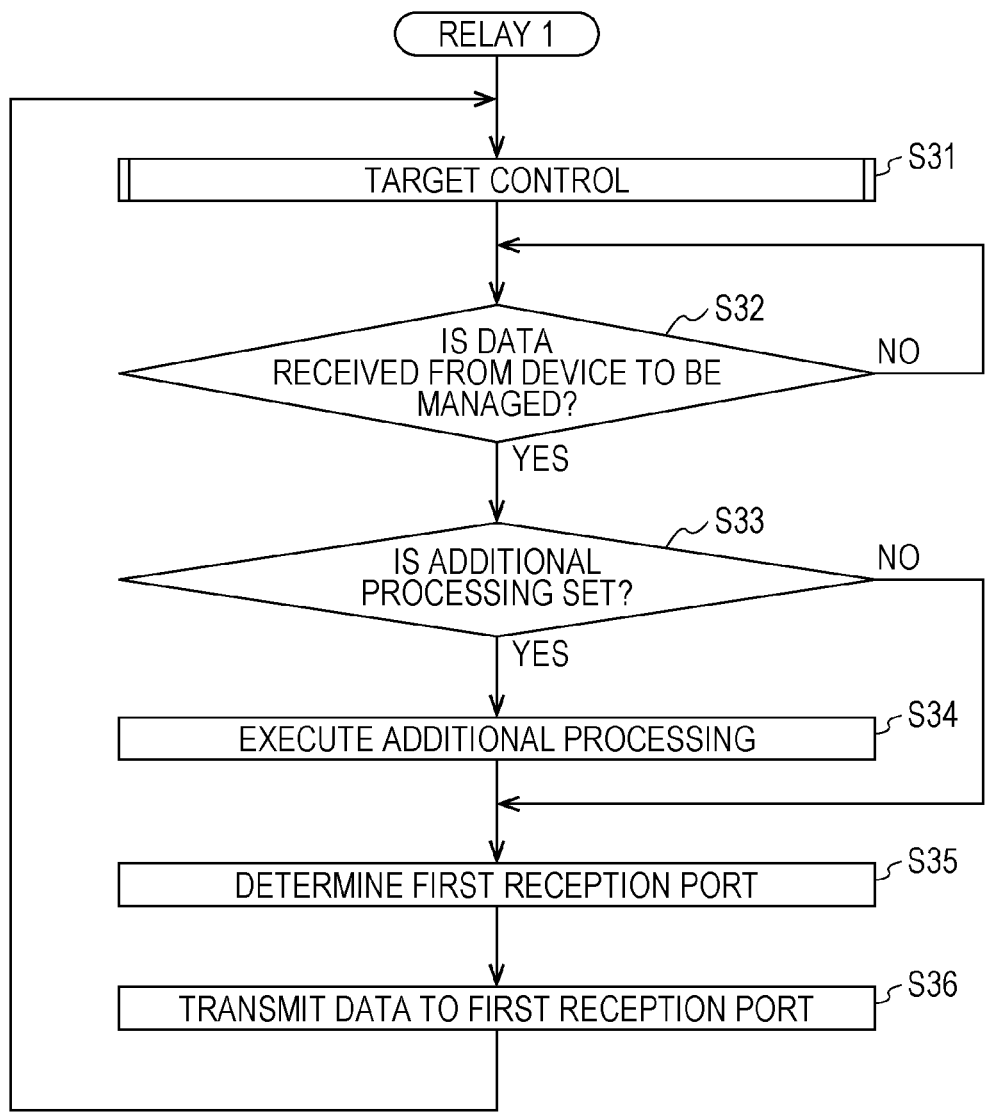
FIG. 12 is a flowchart illustrating an example of a flow of relay processing.

FIG. 12 is a flowchart illustrating an example of a flow of relay processing. Relay processing is processing executed by the CPU 301 when the CPU 301 included in the relay server 300 executes a relay program stored in the ROM 302, the RAM 303, the HDD 304, or the CD-ROM 308A.

Referring to FIG. 12, the CPU 301 included in the relay server 300 executes target control processing (step S31), and advances the processing to step S32.

Figure 13:
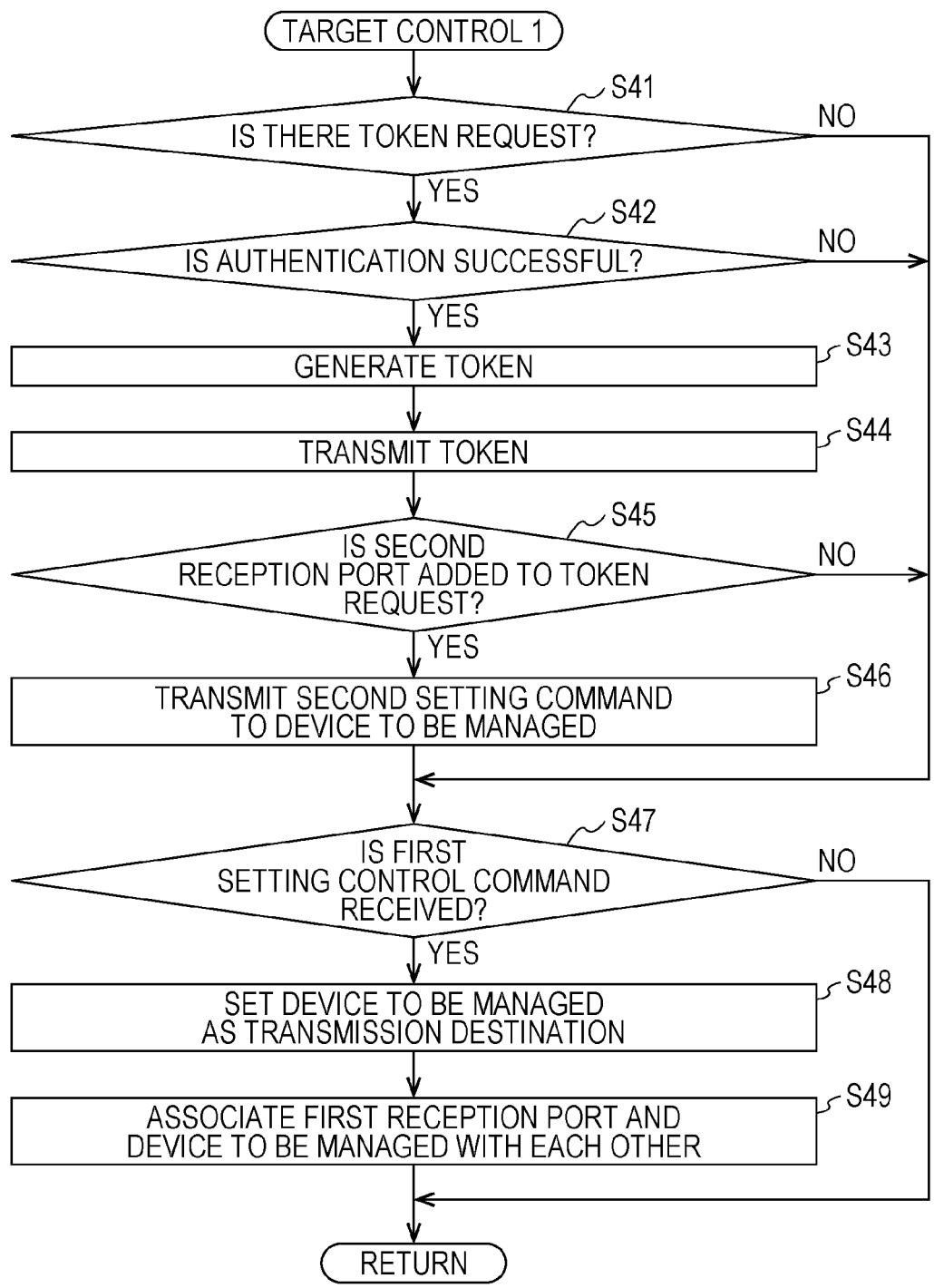
FIG. 13 is a flowchart illustrating an example of a flow of target control processing.

FIG. 13 is a flowchart illustrating an example of a flow of target control processing. Referring to FIG. 13, it is determined whether or not issuance of a token is requested from the service providing server 200 (step S41). Regarding the token issuance request, if a token request command is received from the service providing server 200, the processing proceeds to step S42, and if not, the processing proceeds to step S47.

In step S42, the authentication screen is transmitted to the service providing server 200 that has requested issuance of the token, and it is determined whether or not the authentication is successful. If the authentication is successful, the processing proceeds to step S43, and if not, the processing proceeds to step S47. In step S43, a token is generated, and the processing proceeds to step S44. In step S44, the token is transmitted to the service providing server 200 that has transmitted the token request command, and the processing proceeds to step S45.

In step S45, it is determined whether or not position information indicating the second reception port is added to the token request command received in step S41. If position information indicating the second reception port is added, the processing proceeds to step S46, and if not, the processing proceeds to step S47.

In step S46, the second setting command is transmitted to the device to be managed, and the processing proceeds to step S47. The device to be managed is identified from device identification information included in the token request command, and the second setting command is transmitted to the identified device to be managed. The second setting command is an API command for setting the second reception port indicated by the position information included in the token request command. As a result, the second reception port is set in the device to be managed.

In step S47, it is determined whether or not a first setting control command is received. The first setting control command is received together with the token transmitted in step S44. The first setting control command is a command for setting the first reception port which is a window for data generated by the device to be managed. If a first setting control command is received, the processing proceeds to step S48, and if not, the processing returns to the relay processing. The first setting control command includes device identification information of the device to be managed and position information indicating the first reception port.

In step S48, the device to be managed is set as the transmission destination, and the processing proceeds to step S49. Specifically, the first setting command is transmitted to the device to be managed. The first setting command includes transmission destination information indicating the data transmission destination. Transmission destination information includes a network address of the relay device.

In step S49, the device to be managed and the first reception port are associated with each other, and the processing returns to the relay processing. Specifically, a set of device identification information of the device to be managed and position information indicating the first reception port is stored in the HDD 304.

Returning to FIG. 12, in step S32, it is determined whether or not data is received from the device to be managed. The processing is in a standby state until data is received from the device to be managed (NO in step S32), and when data is received from the device to be managed (YES in step S32), the processing proceeds to step S33.

In step S33, it is determined whether or not additional processing is defined for the service corresponding to the device to be managed. If additional processing is defined, the processing proceeds to step S34, and if not, the processing proceeds to step S35. In step S34, additional processing is executed, and the processing proceeds to step S35.

In step S35, the first reception port is determined, and the processing proceeds to step S36. The first reception port associated with the device to be managed is determined on the basis of the data of the set of device identification information of the device to be managed and position information indicating the first reception port stored in the HDD 304. In step S36, the data received in step S32 is transmitted to the first reception port, and the processing returns to step S31.

Figure 14:
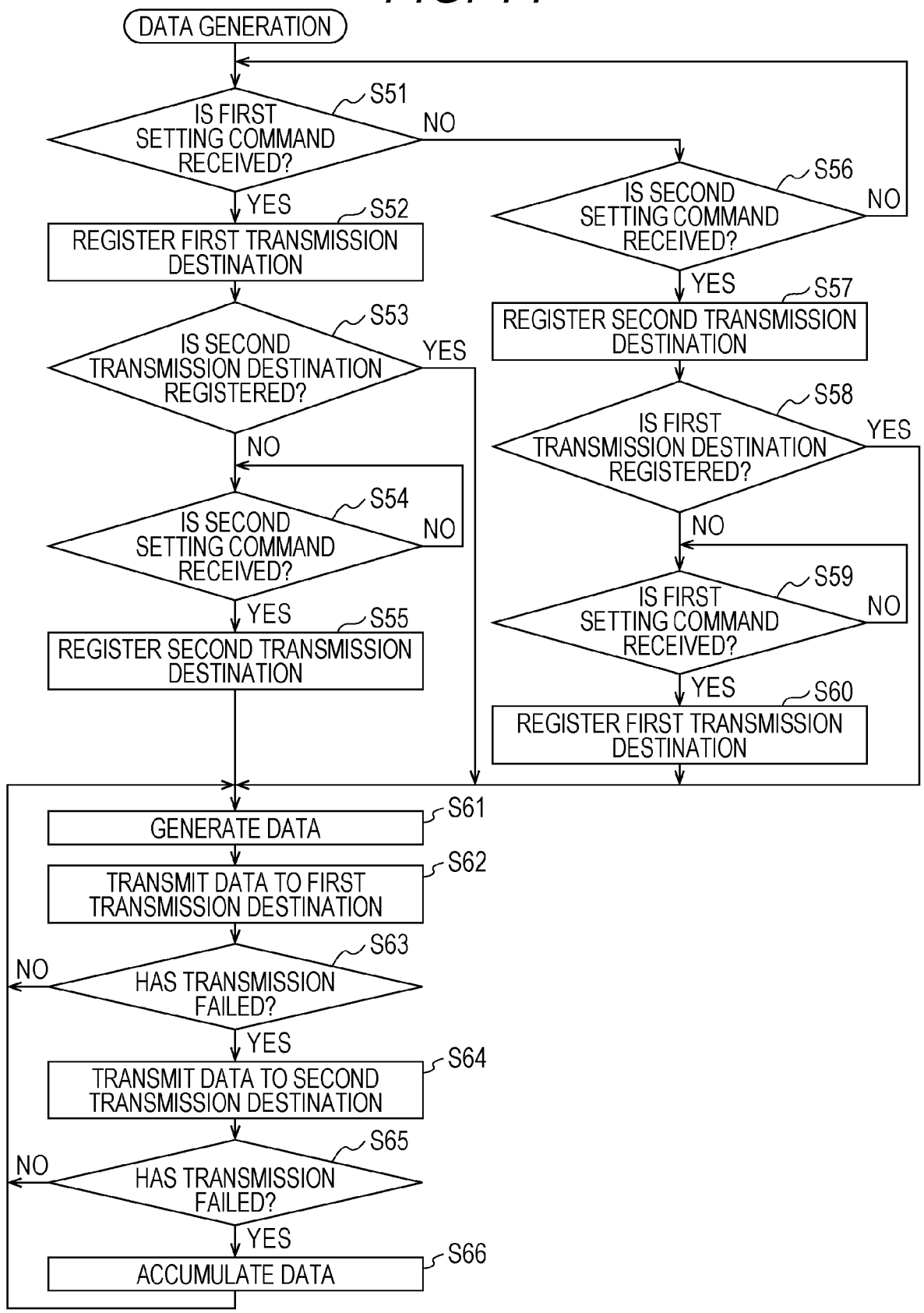
FIG. 14 is a flowchart illustrating an example of a flow of data generation processing.

FIG. 14 is a flowchart illustrating an example of a flow of data generation processing. Data generation processing is processing executed by the CPU 111 when the CPU 111 included in the MFP 100 executes a data generation program stored in the ROM 113, the RAM 114, the HDD 115, or the CD-ROM 118.

Referring to FIG. 14, the CPU 111 included in the MFP 100 determines whether or not a first setting command is received. If a first setting command is received from the relay device, the processing proceeds to step S52, and if not, the processing proceeds to step S56. In step S52, a transmission destination identified by transmission destination information included in the first setting command is registered as a first transmission destination, and the processing proceeds to step S53.

In step S53, it is determined whether or not a second transmission destination is registered. If a second transmission destination is registered, the processing proceeds to step S61, and if not, the processing proceeds to step S54. In step S54, it is determined whether or not a second setting command is received. The processing is in a standby state until a second setting command is received from the relay device (NO in step S54), and when a second setting command is received from the relay device (YES in step S54), the processing proceeds to step S55. In step S55, the second reception port included in the second setting command is registered as the second transmission destination, and the processing proceeds to step S61.

On the other hand, in step S56, it is determined whether or not a second setting command is received. If a second setting command is received from the relay device, the processing proceeds to step S57, and if not, the processing returns to step S51. In step S57, the second reception port included in the second setting command is registered as the second transmission destination, and the processing proceeds to step S58.

In step S58, it is determined whether or not a first transmission destination is registered. If a first transmission destination is registered, the processing proceeds to step S61, and if not, the processing proceeds to step S59. In step S59, it is determined whether or not a first setting command is received. The processing is in a standby state until a first setting command is received from the relay device (NO in step S59), and when a first setting command is received from the relay device (YES in step S59), the processing proceeds to step S60. In step S60, a transmission destination identified by transmission destination information included in the first setting command is registered as the first transmission destination, and the processing proceeds to step S61.

In step S61, data is generated, and the processing proceeds to step S62. In step S62, data is transmitted to the first transmission destination, and the processing proceeds to step S63. In step S63, it is determined whether or not data transmission has failed. If the data transmission has failed, the processing proceeds to step S64, and if not, the processing returns to step S61.

In step S64, data is transmitted to the second transmission destination, and the processing proceeds to step S65. In step S65, it is determined whether or not data transmission has failed. If the data transmission has failed, the processing proceeds to step S66, and if not, the processing returns to step S61. In step S66, the data generated in step S61 is stored in the HDD 115, and the processing returns to step S61.

First Modification

In the above embodiment, the token issued by the relay device includes position information indicating the second reception port. In a first modification, a token does not include position information indicating a second reception port, and an API command includes position information indicating the second reception port. A relay device causes a device to be managed to set the second reception port in response to reception of the API command including the second reception port.

Figure 15:
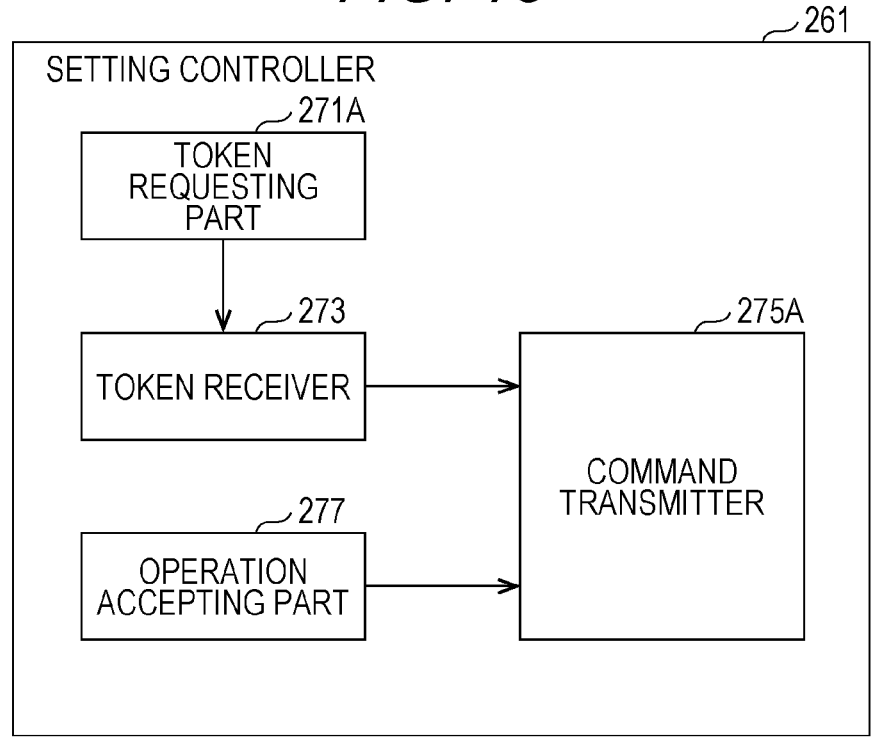
FIG. 15 is a block diagram illustrating an example of functions of a setting controller of a first modification.

FIG. 15 is a block diagram illustrating an example of functions of a setting controller of the first modification. Referring to FIG. 15, the difference from the functions illustrated in FIG. 6 is that the token requesting part 271 and the command transmitter 275 are changed to a token requesting part 271A and a command transmitter 275A, respectively, and an operation accepting part 277 is added. Other functions are the same as those illustrated in FIG. 6, and thus, description thereof will not be repeated here.

The token requesting part 271A requests the relay device identified by a registration record to issue a token. The token requesting part 271A transmits a token request command to the relay device. The token request command transmitted by the token requesting part 271A does not include position information indicating a first reception port and device identification information of a device to be managed.

The operation accepting part 277 accepts an operation input by a user operating a service providing server 200. When the operation input by the user is an operation for controlling the relay device, the operation accepting part 277 outputs operation identification information indicating the operation to the command transmitter 275A.

The command transmitter 275A transmits a first setting control command to the relay device using a token. Specifically, a token is transmitted together with the first setting control command. The first setting control command is, for example, an API command that causes the relay device to execute predetermined processing. The first setting control command transmitted here is a command for setting the first reception port which is a window for data generated by the device to be managed. The first setting control command includes device identification information of the device to be managed and position information indicating the first reception port.

In addition, when transmitting a command for controlling the relay device after transmitting the first setting control command to the relay device, the command transmitter 275A adds position information indicating the first reception port and device identification information of the device to be managed to the command and transmits the command. The command for controlling the relay device after transmitting the first setting control command to the relay device includes a command corresponding to operation identification information input from the operation accepting part 277 and a command requesting retransmission of data. In addition, the command transmitter 275A may add the position information indicating the first reception port and the device identification information of the device to be managed to the first setting control command and transmit the first setting control command.

Figure 16:
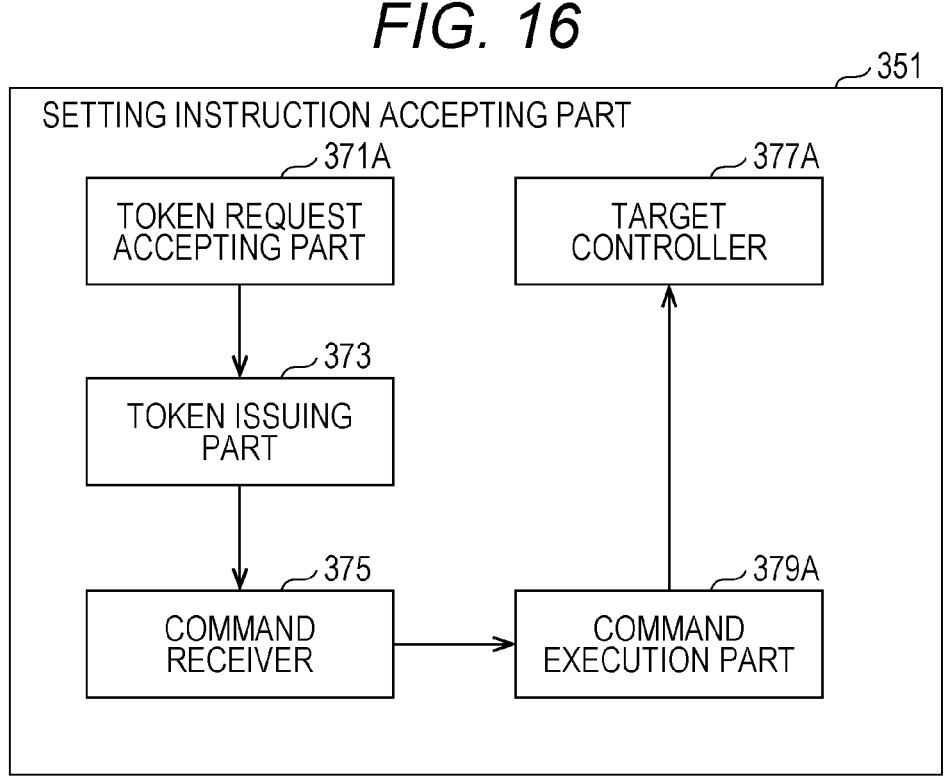
FIG. 16 is a block diagram illustrating an example of functions of a setting instruction accepting part of the first modification.

FIG. 16 is a block diagram illustrating an example of functions of a setting instruction accepting part of the first modification. Referring to FIG. 16, the difference from the functions illustrated in FIG. 8 is that the token request accepting part 371, the target controller 377, and the command execution part 379 are changed to a token request accepting part 371A, a target controller 377A, and a command execution part 379A, respectively. Other functions are the same as those illustrated in FIG. 8, and thus, description thereof will not be repeated here.

The token request accepting part 371A receives a token request command from the service providing server 200. In a case where a condition for issuing a token is satisfied, the token request accepting part 371A outputs an issue instruction to the token issuing part 373. In the first modification, the token request command does not include position information indicating a second reception port and device identification information of the device to be managed.

The command receiver 375 receives the first setting control command received together with the token. The first setting control command received by the command receiver 375 is a command for setting the first reception port which is a window for data generated by the device to be managed. The command receiver 375 outputs the received first setting control command to the command execution part 379A.

The command execution part 379A outputs an association instruction including a set of device identification information of the device to be managed and position information indicating the first reception port included in the first setting control command to an associating part 353, and outputs a first setting instruction instructing the device to be managed to set the data transmission destination to the target controller 377A. The first setting instruction includes device identification information of the device to be managed included in the first setting control command and transmission destination information indicating a data transmission destination. Transmission destination information includes a network address of the relay device.

In response to input of the first setting instruction from the command execution part 379A, the target controller 377A controls the device to be managed and causes the device to be managed to set the relay server 300 as the data transmission destination. The target controller 377A identifies the device to be managed from the device identification information included in the first setting instruction, and transmits a first setting command for causing the device to be managed to set the transmission destination identified by transmission destination information included in the first setting instruction. The first setting command is an API command prepared by the device to be managed. As a result, the data transmission destination is set in the device to be managed. Note that the administrator may operate the device to be managed to set the data transmission destination.

The command receiver 375 may receive a command to which position information indicating the second reception port and device identification information of the device to be managed are added from the relay device. When position information indicating the second reception port and device identification information of the device to be managed are added to the command input from the command receiver 375, the command execution part 379A outputs a second setting instruction for instructing the device to be managed to set the second reception port to the target controller 377A. The second setting instruction includes position information indicating the second reception port and device identification information of the device to be managed.

In response to input of the second setting instruction from the command execution part 379A, the target controller 377A controls the device to be managed and causes the device to be managed to set the second reception port. The target controller 377 identifies the device to be managed from the device identification information included in the second setting instruction, and transmits a second setting command for causing the device to be managed to set the second reception port included in the second setting instruction. The second setting command is an API command prepared by the device to be managed. As a result, the second reception port is set in the device to be managed. Note that the administrator may operate the device to be managed to set the second reception port.

Figure 17:
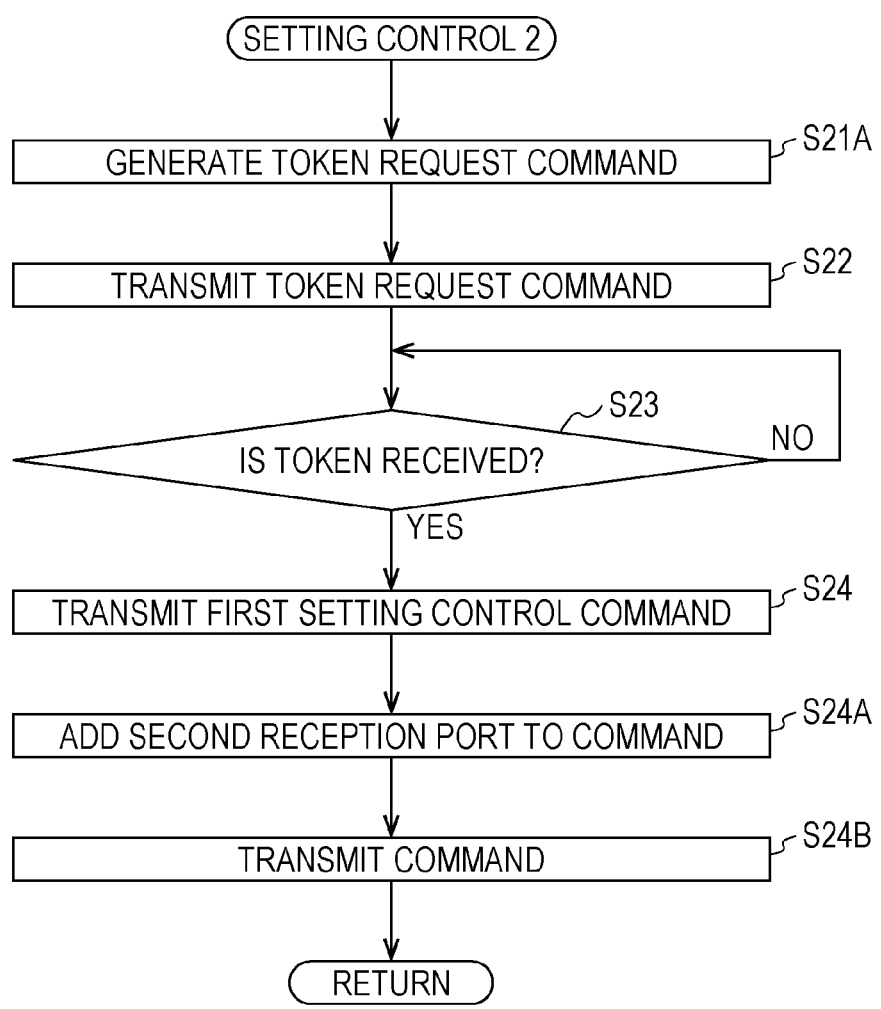
FIG. 17 is a flowchart illustrating an example of a flow of a setting control processing of the first modification.

FIG. 17 is a flowchart illustrating an example of a flow of setting control processing of the first modification. Referring to FIG. 17, the difference from the processing illustrated in FIG. 11 is that step S21 is changed to step S21A, and steps S24A and S24B are added after step S24. Other processing is the same as the processing illustrated in FIG. 11, and thus, description thereof will not be repeated here.

In step S21A, a token request command is generated. The token request command generated here does not include position information indicating the second reception port generated in step S04 of the service providing processing and device identification information of the device to be managed.

Figure 18:
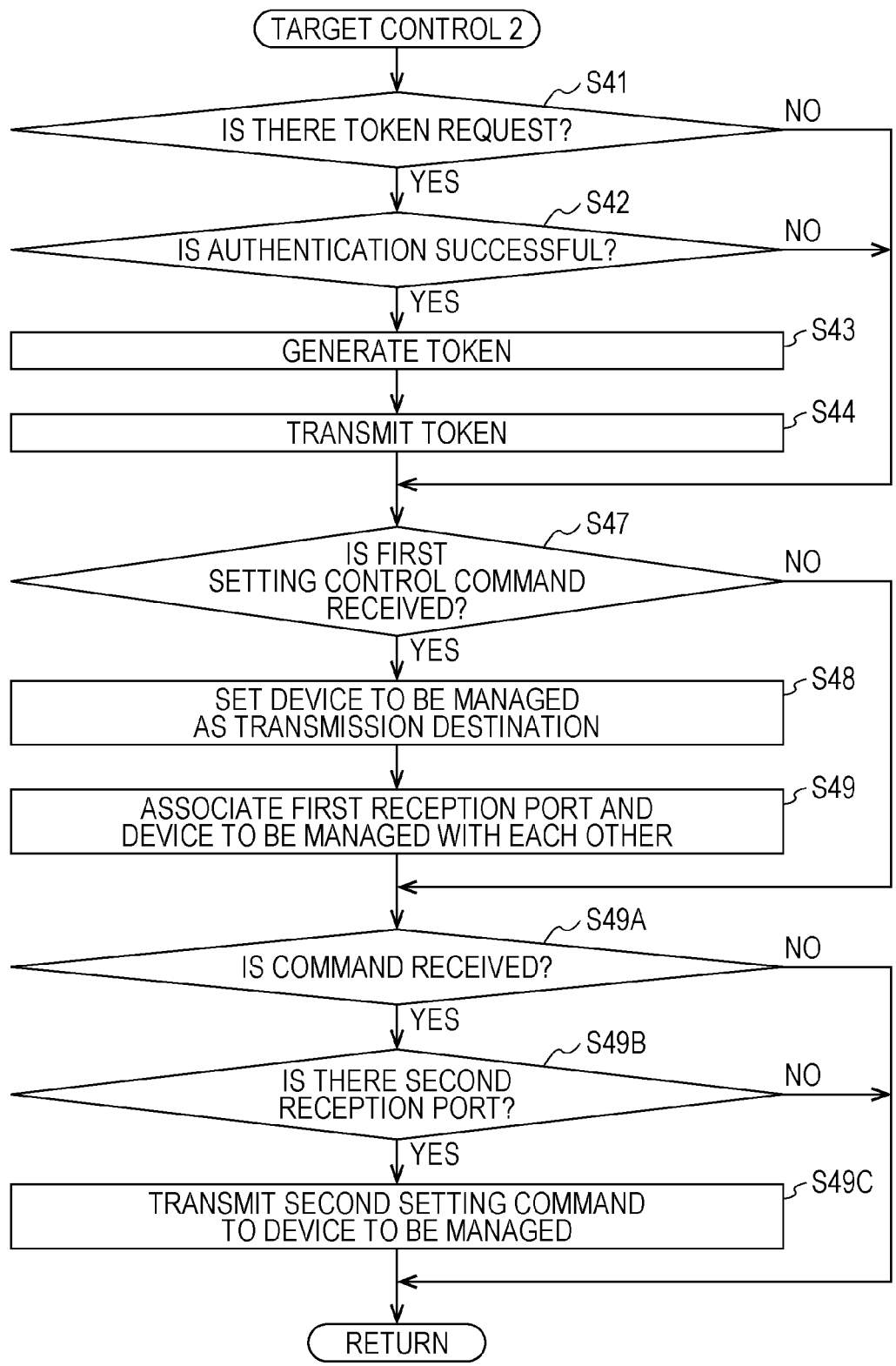
FIG. 18 is a flowchart illustrating an example of a flow of target control processing of the first modification.

In step S24A, position information indicating the second reception port is added to the command to be transmitted to the relay device, and the processing proceeds to step S24B. In step S24B, the command to which the position information indicating the second reception port is added is transmitted to the relay device using the token received in step S23, and the processing returns to the service providing processing. The command transmitted here is a command transmitted to the relay device next to the first setting control command, and includes device identification information of the device to be managed and position information indicating the first reception port. FIG. 18 is a flowchart illustrating an example of a flow of target control processing of the first modification. Referring to FIG. 18, the difference from the processing illustrated in FIG. 13 is that steps S45 and S46 are deleted, and steps S49A to S49C are added after step S49. Other processing is the same as the processing illustrated in FIG. 13, and thus, description thereof will not be repeated here.

In step S49A, it is determined whether or not a command is received from the management device. The command is received together with the token transmitted in step S44. If the command is received, the processing proceeds to step S49B, and if not, the processing returns to the relay processing. In step S49B, it is determined whether or not position information indicating the second reception port is added to the received command. If position information indicating the second reception port is added, the processing proceeds to step S49C, and if not, the processing returns to the relay processing.

In step S49C, the second setting command is transmitted to the device to be managed, and the processing returns to the relay device. The device to be managed is identified from device identification information added to the received command together with the position information indicating the second reception port, and the second setting command is transmitted to the identified device to be managed. The second setting command is an API command for setting the second reception port. As a result, the second reception port is set in the device to be managed.

Second Modification

In the above embodiment, the token issued by the relay device includes position information indicating the second reception port. In the first modification, the token does not include the position information indicating the second reception port, the relay device temporarily stores the position information indicating the second reception port, and the relay device causes the device to be managed to set the second reception port in response to reception of the API command.

Figure 19:
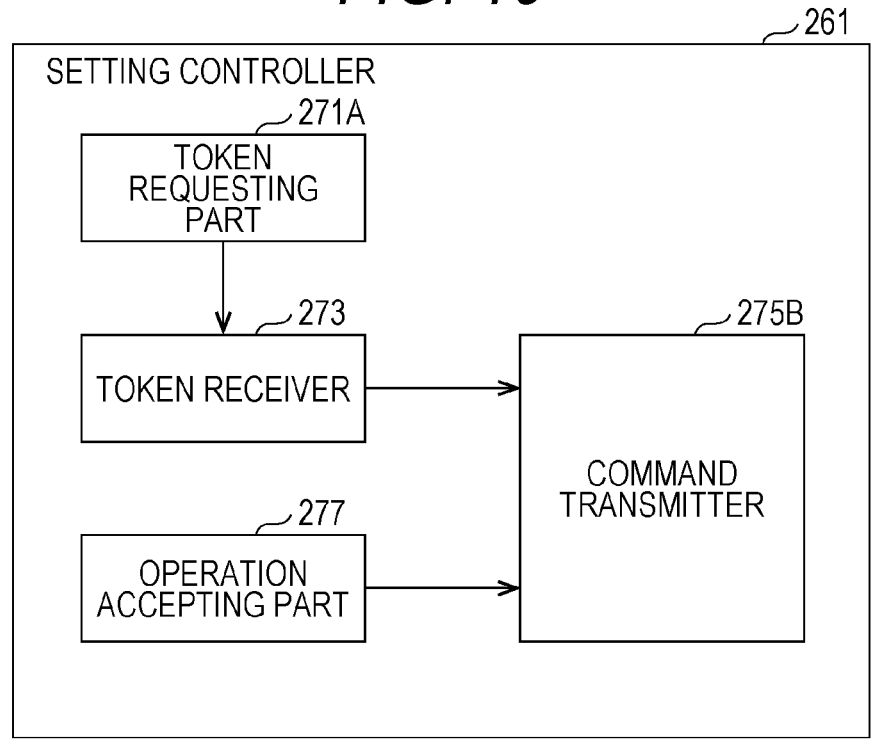
FIG. 19 is a block diagram illustrating an example of functions of a setting controller of a second modification.

FIG. 19 is a block diagram illustrating an example of functions of a setting controller of a second modification. Referring to FIG. 19, the difference from the functions illustrated in FIG. 6 is that the token requesting part 271 and the command transmitter 275 are changed to a token requesting part 271A and a command transmitter 275B, respectively, and an operation accepting part 277 is added. Other functions are the same as those illustrated in FIG. 6, and thus, description thereof will not be repeated here.

The token requesting part 271A requests the relay device identified by a registration record to issue a token. The token request command transmitted by the token requesting part 271A does not include position information indicating a second reception port and device identification information of a device to be managed.

The operation accepting part 277 accepts an operation input by a user operating a service providing server 200. When the operation input by the user is an operation for controlling the relay device, the operation accepting part 277 outputs operation identification information indicating the operation to the command transmitter 275B.

The command transmitter 275B transmits a first setting control command to the relay device using a token. Specifically, a token is transmitted together with the first setting control command. The first setting control command is, for example, an API command that causes the relay device to execute predetermined processing. The first setting control command transmitted here is a command for setting the first reception port which is a window for data generated by the device to be managed. The first setting control command includes device identification information of the device to be managed and position information indicating the first reception port.

In addition, the command transmitter 275B transmits a second reception port storage command to the relay device. The second reception port storage command includes the second reception port and device identification information of the device to be managed.

Further, the command transmitter 275B transmits a command after transmitting the second reception port storage command to the relay device. The command that the command transmitter 275B transmits after transmitting the second reception port storage command to the relay device includes a command corresponding to operation identification information input from the operation accepting part 277 and a command requesting retransmission of data.

Figure 20:
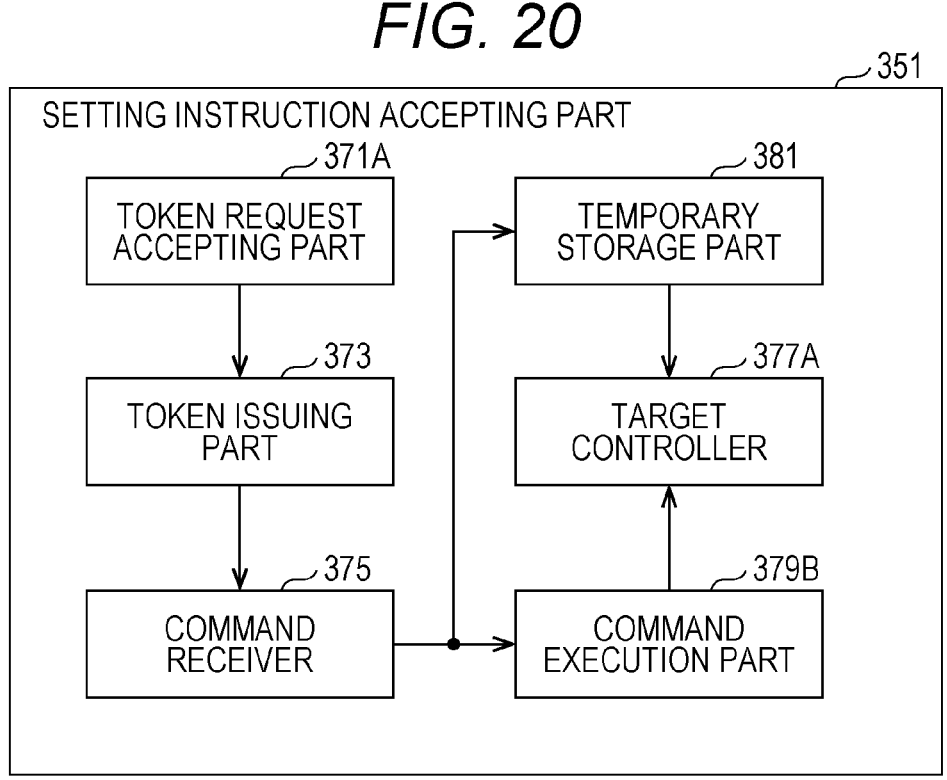
FIG. 20 is a block diagram illustrating an example of functions of a setting instruction accepting part of the second modification.

FIG. 20 is a block diagram illustrating an example of functions of a setting instruction accepting part of the second modification. Referring to FIG. 20, the difference from the functions illustrated in FIG. 8 is that the token request accepting part 371, the target controller 377, and the command execution part 379 are changed to a token request accepting part 371A, a target controller 377A, and a command execution part 379B, respectively, and a temporary storage part 381 is added. Other functions are the same as those illustrated in FIG. 8, and thus, description thereof will not be repeated here.

The token request accepting part 371A accepts a token issue request from the service providing server 200. In a case where a condition for issuing a token is satisfied, the token request accepting part 371A outputs an issue instruction to the token issuing part 373. In the second modification, the token request command transmitted for the token issue request does not include position information indicating a second reception port and device identification information of the device to be managed.

A command receiver 375 receives a command received together with the token, and outputs the received command to the command execution part 379B.

A first setting control command may be received by the command receiver 375. The first setting control command is a command for setting the first reception port which is a window for data generated by the device to be managed. The command execution part 379B outputs an association instruction including a set of device identification information of the device to be managed and position information indicating the first reception port included in the first setting control command to an associating part 353, and outputs a first setting instruction to the target controller 377A. The first setting instruction includes device identification information of the device to be managed included in the first setting control command and transmission destination information indicating a data transmission destination. Transmission destination information includes a network address of the relay device.

In response to input of the first setting instruction from the command execution part 379B, the target controller 377A controls the device to be managed and causes the device to be managed to set the relay server 300 as the data transmission destination. The target controller 377A identifies the device to be managed from the device identification information included in the first setting instruction, and transmits a first setting command for causing the device to be managed to set the transmission destination identified by transmission destination information included in the first setting instruction. The first setting command is an API command prepared by the device to be managed. As a result, the data transmission destination is set in the device to be managed. Note that the administrator may operate the device to be managed to set the data transmission destination.

The command receiver 375 may receive a second reception port storage command from the relay device. When a second reception port storage command is input from the command receiver 375, the command execution part 379B outputs, to the temporary storage part 381, a storage instruction to store position information indicating the second reception port and device identification information of the device to be managed included in the second reception port storage command.

In response to input of the storage instruction, the temporary storage part 381 stores the position information indicating the second reception port and the device identification information of the device to be managed in an HDD 304.

When the command receiver 375 receives a command after receiving the second reception port storage command from the relay device, the command execution part 379B outputs a second setting instruction to the target controller 377A.

In response to input of the second setting instruction from the command execution part 379A, the target controller 377A reads the position information indicating the second reception port and the device identification information of the device to be managed stored in the HDD 304 by the temporary storage part 381. The target controller 377A identifies the device to be managed from the read device identification information, and transmits a second setting command for causing the device to be managed to set the second reception port. The second setting command is an API command prepared by the device to be managed. As a result, the second reception port is set in the device to be managed.

Figure 21:
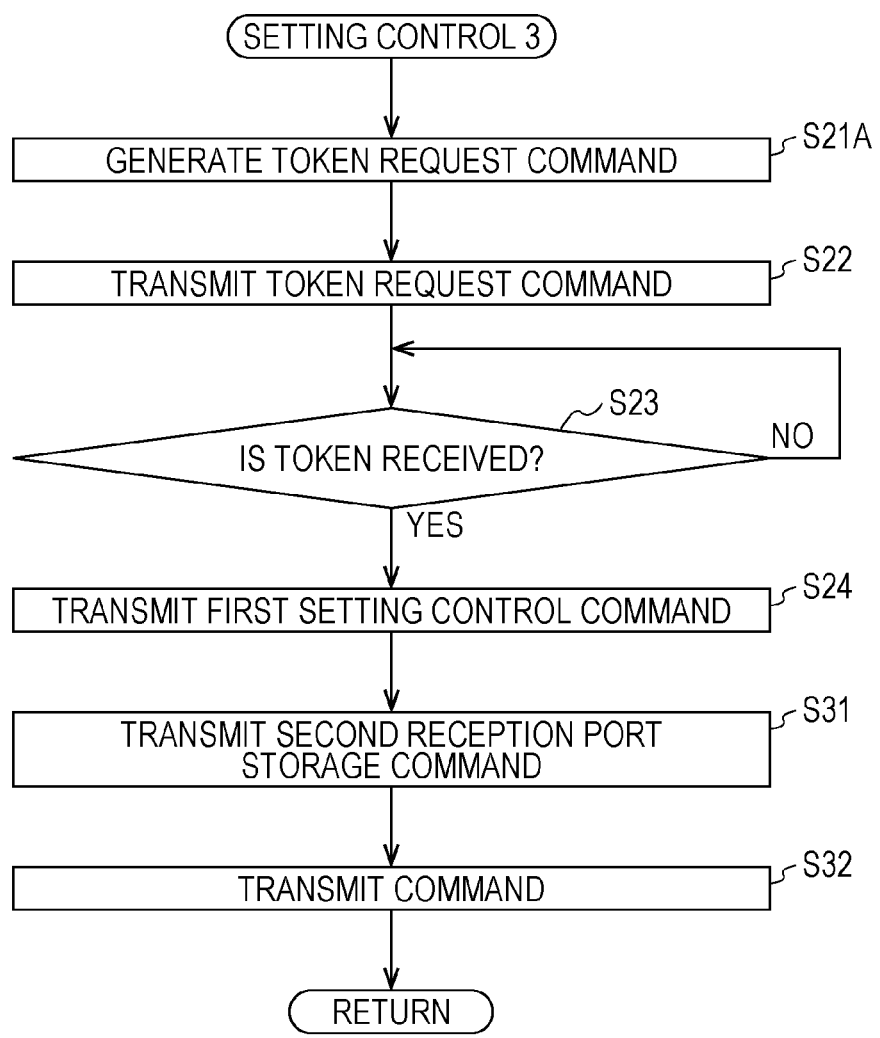
FIG. 21 is a flowchart illustrating an example of a flow of setting control processing of the second modification.

FIG. 21 is a flowchart illustrating an example of a flow of setting control processing of the second modification. Referring to FIG. 21, the difference from the processing illustrated in FIG. 11 is that step S21 is changed to step S21A, and steps S31 and S32 are added after step S24. Other processing is the same as the processing illustrated in FIG. 11, and thus, description thereof will not be repeated here.

In step S21A, a token request command is generated. The token request command generated here does not include position information indicating the second reception port generated in step S04 of the service providing processing and device identification information of the device to be managed.

In step S31, the second reception port storage command is transmitted to the relay device using the token received in step S23, and the processing proceeds to step S32. In step S32, a command for controlling the relay device is transmitted, and the processing returns to the service providing processing. The command transmitted here is an arbitrary command such as a command for requesting the relay device to retransmit data.

Figure 22:
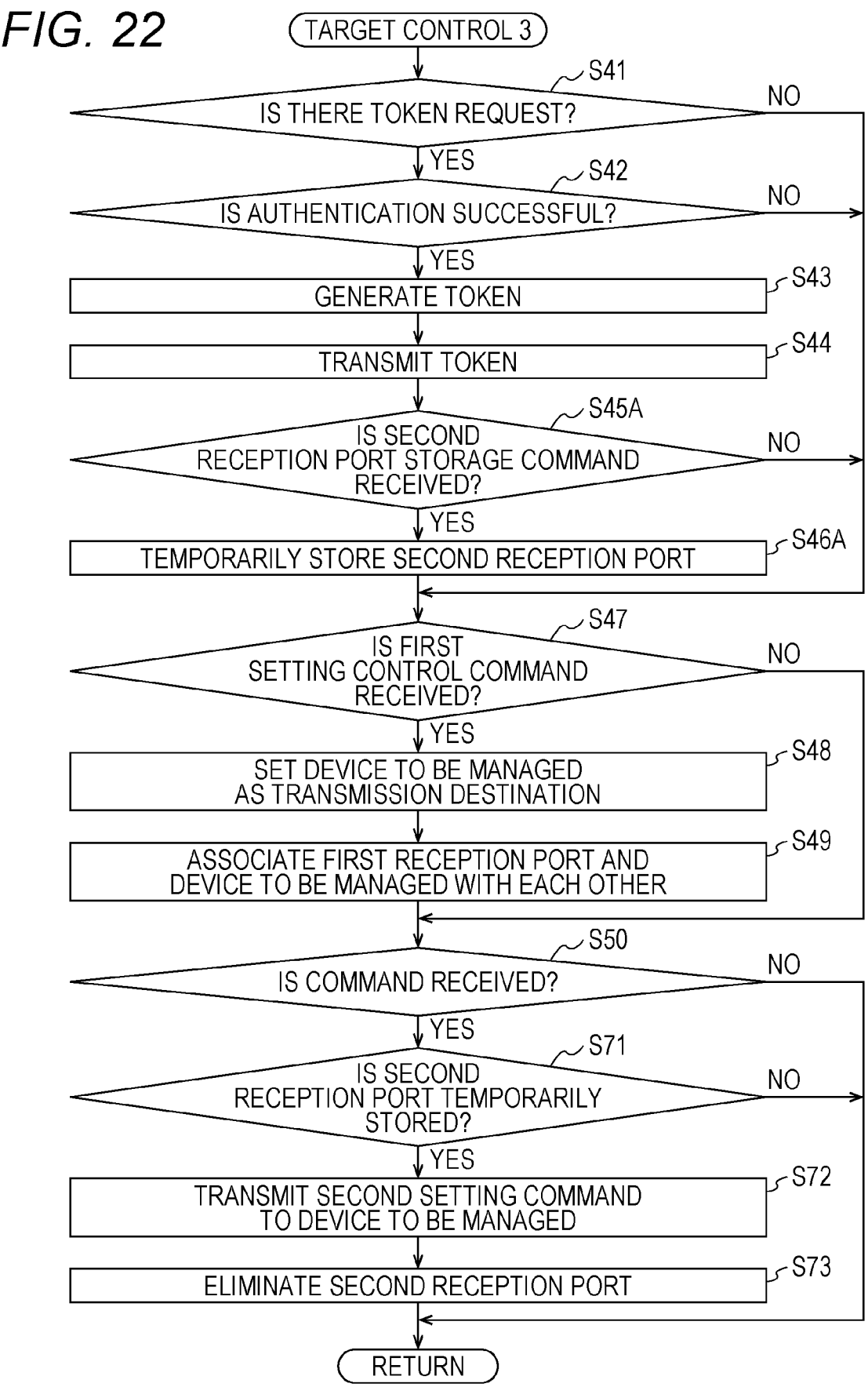
FIG. 22 is a flowchart illustrating an example of a flow of target control processing of the second modification.

FIG. 22 is a flowchart illustrating an example of a flow of target control processing of the second modification. Referring to FIG. 22, the difference from the processing illustrated in FIG. 13 is that steps S45 and S46 are changed to steps S45A and S46A, respectively, and steps S70 to S73 are added after step S49. Other processing is the same as the processing illustrated in FIG. 13, and thus, description thereof will not be repeated here.

In step S45A, it is determined whether or not the second reception port storage command is received. If the second reception port storage command is received, the processing proceeds to step S46A, and if not, the processing returns to the relay processing. In step S46A, the position information indicating the second reception port included in the second reception port storage command and the device identification information of the device to be managed are stored in the HDD 304, and the processing proceeds to step S47.

In step S70, it is determined whether or not a command is received. If a command is received, the processing proceeds to step S71, and if not, the processing returns to the relay processing. In step S71, it is determined whether or not position information indicating the second reception port is temporarily stored in the HDD 304. If position information indicating the second reception port is stored, the processing proceeds to step S72, and if not, the processing returns to the relay processing. In step S72, a second setting command is transmitted to the device to be managed, and the processing proceeds to step S73. The second setting command is an API command for setting the second reception port. As a result, the second reception port is set in the device to be managed. In step S73, the second reception port is eliminated from the HDD 304, and the processing returns to the relay processing.

Third Modification

In a third modification, a management device causes a relay device to continuously issue tokens. The management device transmits a second token request command to the relay device while a token issued first by the relay device is valid, and includes position information indicating a second reception port in the token request command.

Figure 23:
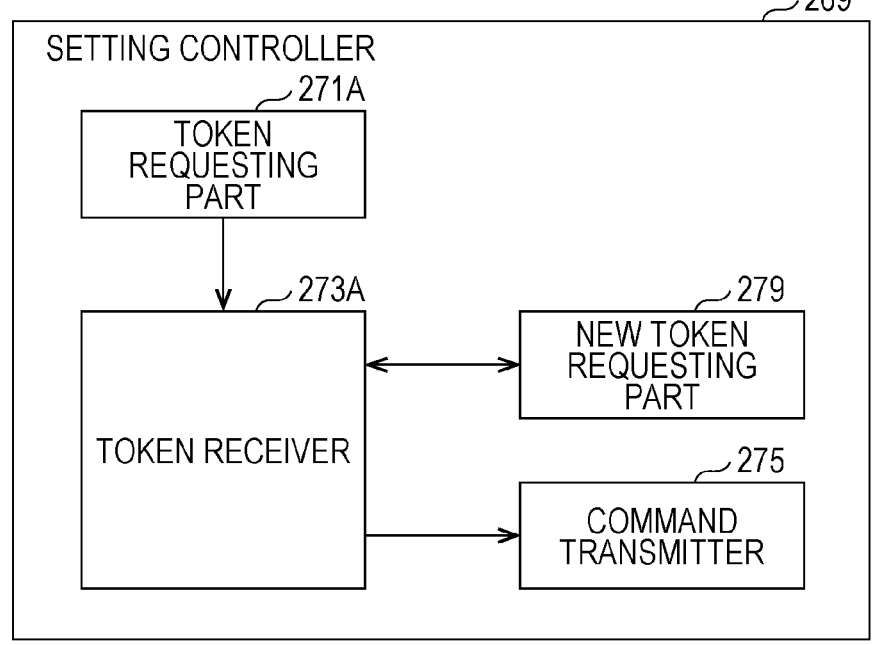
FIG. 23 is a block diagram illustrating an example of functions of a setting controller of a third modification.

FIG. 23 is a block diagram illustrating an example of functions of a setting controller of a third modification. Referring to FIG. 23, the difference from the functions illustrated in FIG. 6 is that the token requesting part 271 and the token receiver 273 are changed to a token requesting part 271A and a token receiver 273A, respectively, and a new token requesting part 279 is added. Other functions are the same as the functions illustrated in FIG. 6, and thus, description thereof will not be repeated here.

The token requesting part 271A requests the relay device identified by a registration record to issue a token. The token may be an authentication token or an authorization token.

The token request command transmitted by the token requesting part 271A does not include position information indicating a second reception port and device identification information of the device to be managed.

The token receiver 273A receives the token issued by the relay device. The token receiver 273A outputs the token to a command transmitter 275 and the new token requesting part 279. The token received by the token receiver 273A at this stage does not include position information indicating the second reception port. This token is referred to as a first token.

The new token requesting part 279 requests the relay device identified by the registration record to issue a token while the first token is valid. The token request command transmitted by the new token requesting part 279 includes position information indicating the second reception port.

In response to reception of the token request command transmitted by the new token requesting part 279, the relay device issues a new token. Here, the new token issued by the relay device is referred to as a new token. The new token includes position information indicating the second reception port.

The token receiver 273A receives the new token issued by the relay device. When receiving the new token, the token receiver 273A discards the first token and outputs the new token to the command transmitter 275.

The command transmitter 275 transmits a first setting command to the relay device using the new token. Specifically, the new token is transmitted together with the first setting command. The first setting command is, for example, an API command that causes the relay device to execute predetermined processing. The first setting command transmitted here is a command for setting a first reception port which is a window for data generated by the device to be managed. The first setting command includes device identification information of the device to be managed and the first reception port.

Figure 24:
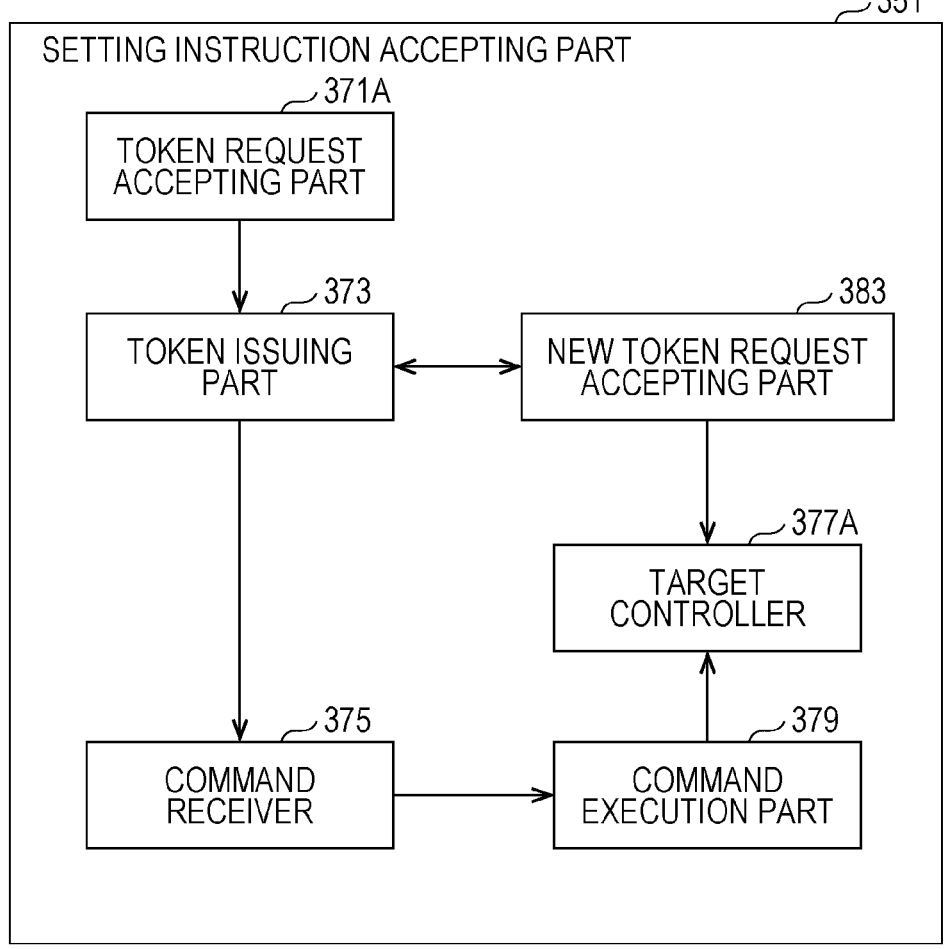
FIG. 24 is a block diagram illustrating an example of functions of a setting instruction accepting part of the third modification.

FIG. 24 is a block diagram illustrating an example of functions of a setting instruction accepting part of the third modification. Referring to FIG. 24, the difference from the functions illustrated in FIG. 8 is that the token request accepting part 371 and the target controller 377 are changed to a token request accepting part 371A and a target controller 377A, respectively, and a new token request accepting part 383 is added. Other functions are the same as those illustrated in FIG. 8, and thus, description thereof will not be repeated here.

The token request accepting part 371A receives a token request command from the management device. The token request command received here does not include position information indicating the second reception port. When authenticating the administrator, the token request accepting part 371A outputs an issue instruction to a token issuing part 373.

The token issuing part 373 issues a token in response to input of an issue instruction. The token issuing part 373 transmits the issued token to the relay device and outputs the token to a command receiver 375 and the new token request accepting part 383.

The new token request accepting part 383 accepts a new token request command during a period in which the token with the management device is valid. The new token request command accepted here includes position information indicating the second reception port. The new token request accepting part 383 outputs an issue instruction to the token issuing part 373 and outputs a second setting instruction to the target controller 377A. The second setting instruction includes position information indicating the second reception port and device identification information of the device to be managed included in the token request command.

The target controller 377A identifies the device to be managed from the device identification information included in the second setting instruction, and transmits the second setting command. The second setting command is a command for causing the device to be managed to set the second reception port included in the second setting instruction, and is an API command prepared by the device to be managed. As a result, the second reception port is set in the device to be managed.

Figure 25:
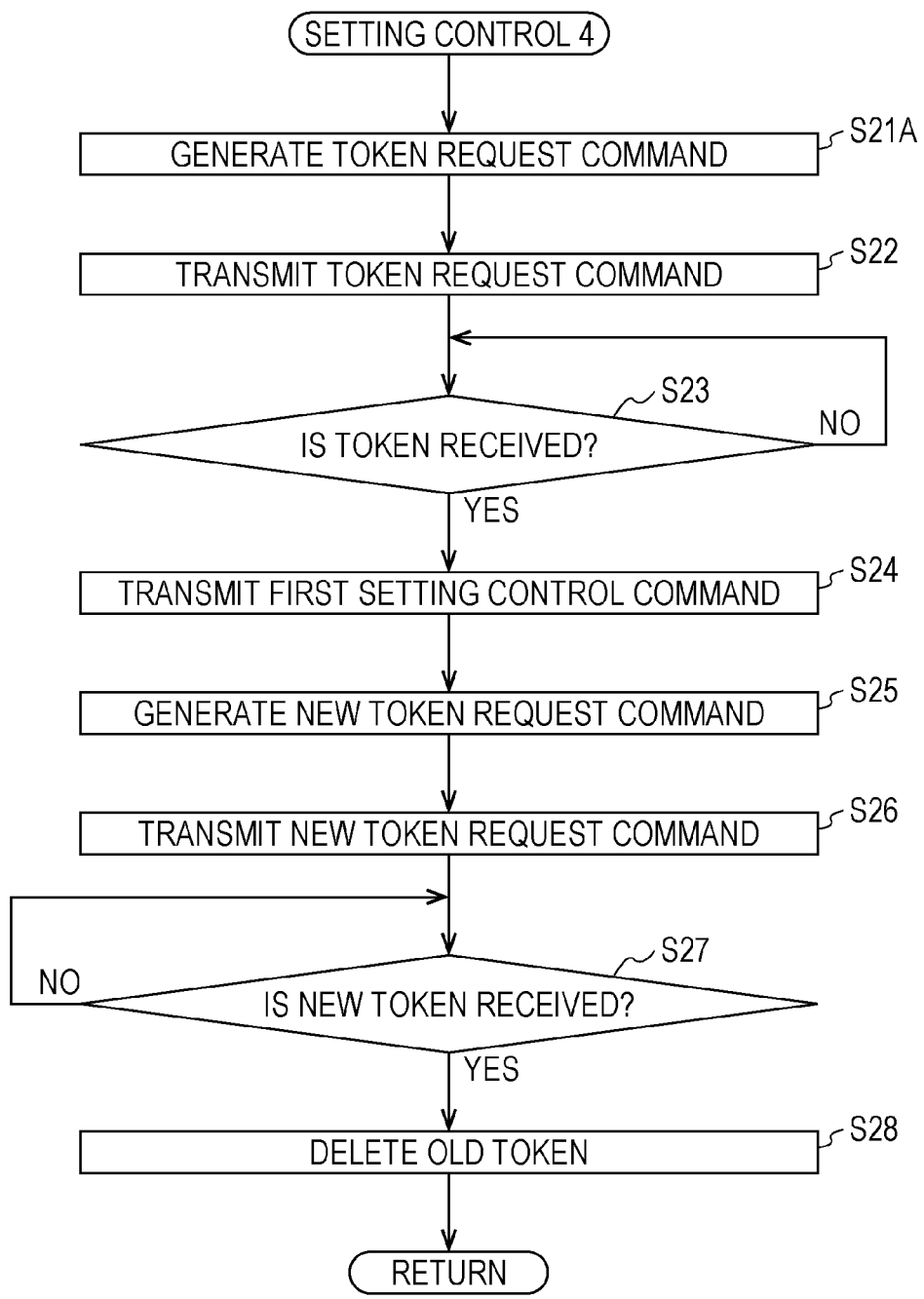
FIG. 25 is a flowchart illustrating an example of a flow of setting control processing of the third modification.

FIG. 25 is a flowchart illustrating an example of a flow of a setting control processing of the third modification. Referring to FIG. 25, the difference from the processing illustrated in FIG. 11 is that step S21 is changed to step S21A and steps S25 to S27 are added. Other processing is the same as the processing illustrated in FIG. 11, and thus, description thereof will not be repeated here.

In step S21A, a token request command is generated. The token request command for requesting issuance of a token generated here does not include position information indicating the second reception port generated in step S04 of the service providing processing and device identification information of the device to be managed.

In step S25, a new token request command is generated. The new token request command includes position information indicating the second reception port generated in step S04 of the service providing processing and device identification information of the device to be managed.

In step S26, the new token request command is transmitted to the relay device, and the processing proceeds to step S27. The relay device is identified by a registration record.

In step S27, it is determined whether or not a new token is received. The processing is in a standby state until a new token is received from the relay device (NO in step S27), and when a new token is received (YES in step S27), the processing proceeds to step S28.

In step S28, the token received in step S23 is deleted, and the processing returns to the service providing processing. After step S28 is executed, the relay device is accessed by using the new token.

Figure 26:
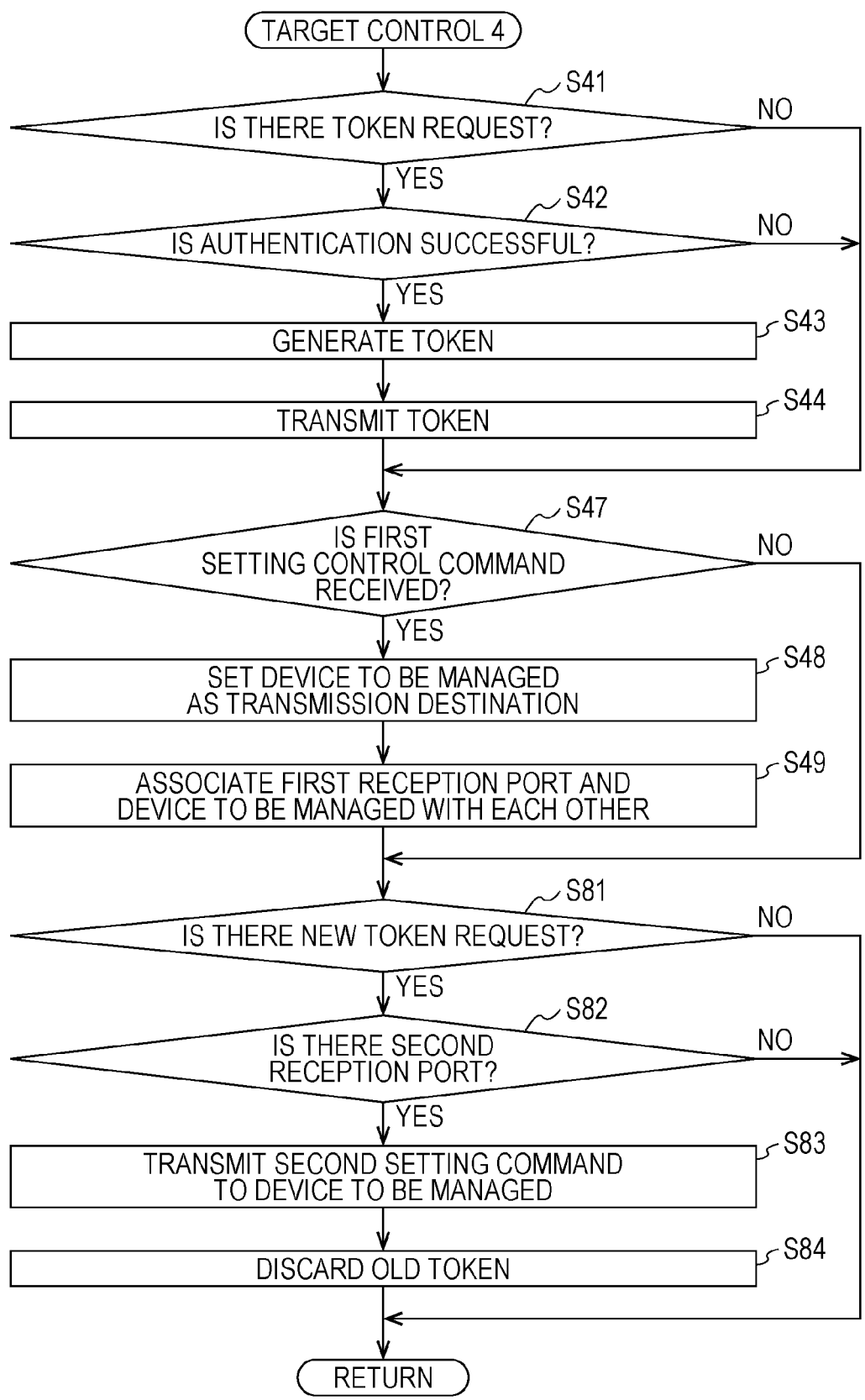
FIG. 26 is a flowchart illustrating an example of a flow of target control processing of the third modification.

FIG. 26 is a flowchart illustrating an example of a flow of target control processing of the third modification. Referring to FIG. 26, the difference from the processing illustrated in FIG. 13 is that steps S45 and S46 are deleted, and steps S81 to S84 are added after step S49. Other processing is the same as the processing illustrated in FIG. 13, and thus, description thereof will not be repeated here.

In step S81, it is determined whether or not a new token request command is received from the management device. If a new token request command is received, the processing proceeds to step S82, and if not, the processing returns to the relay processing.

In step S82, it is determined whether or not position information indicating the second reception port is added to the token request command received in step S81. If position information indicating the second reception port is added, the processing proceeds to step S83, and if not, the processing returns to the relay processing. In step S83, a second setting command is transmitted to the device to be managed, and the processing proceeds to step S84. The device to be managed is identified from device identification information included in the new token request command, and the second setting command is transmitted to the identified device to be managed. The second setting command is an API command for setting the second reception port identified by the position information included in the new token request command. As a result, the second reception port is set in the device to be managed. In step S84, the token generated in step S43 is discarded, and the processing returns to the relay processing.

Fourth Modification

In a fourth modification, when a second transmitter 73 included in an MFP 100 transmits data to a second reception port, the second transmitter 73 transmits a network address indicating a position where the data is stored, instead of transmitting the data itself to be transmitted. The second transmitter 73 stores data at an arbitrary position on the network and acquires the network address. Then, the second transmitter 73 transmits the acquired network address to the second reception port.

A management-side data receiver 257 included in a service providing server 200 of the fourth modification does not receive the data itself from the MFP 100 by the second reception port, but receives the network address of the data. A data processor 259 acquires data identified by the network address by downloading, and executes processing on the data.

Even when the amount of data that can be received by the service providing server 200 at a time by the second reception port is limited, data can be received from the MFP 100 and processed.

In addition, the second transmitter 73 included in the MFP 100 of the fourth modification may transmit a part of data to the second reception port together with the network address indicating the position where the data is stored.

As described above, the data processing system 1 of the present embodiment includes the MFP 100 that is a device to be managed, the service providing server 200 that processes data generated by the MFP 100, and the relay server 300 that relays communication between the MFP 100 and the service providing server 200. The service providing server 200 registers a set of the relay server 300 and the MFP 100, prepares a first reception port via the relay server 300 and a second reception port not via the relay server 300 as reception windows for data generated by the MFP 100, and controls the relay server 300 to set the second reception port in the device to be managed. The relay server 300 causes the MFP 100 to set the second reception port. Since the second reception port is registered in the MFP 100 by the relay server 300, the MFP 100 can transmit data to the service providing server 200 via the relay server 300 and can also transmit data to the service providing server 200 not via the relay server 300. In addition, when the user registers the MFP 100 and the relay server 300 in the service providing server 200, the second reception port is automatically set in the MFP 100, so that an operation of setting the second reception port in the MFP 100 is unnecessary, and thus the operation is simplified.

The MFP 100 registers the relay server 300 as a first transmission destination, and registers the second reception port as a second transmission destination in response to an instruction from the relay server 300 to set the second reception port. Therefore, since the second reception port is automatically set in the MFP 100, the user does not need to perform an operation of setting the second reception port in the MFP 100, and thus the operation is simplified.

When failing to transmit data to the first transmission destination, the MFP 100 transmits the data to the second transmission destination. Therefore, the MFP 100 can transmit data to the service providing server 200 via the relay server 300 in a state in which communication between the MFP 100 and the relay server 300 is possible, and also transmits data to the service providing server 200 not via the relay server 300 in a state in which communication between the MFP 100 and the relay server 300 is not possible. Therefore, since the data generated by the MFP 100 is transmitted to the service providing server 200 regardless of the state of the relay server 300, the service providing server 200 can process the data generated by the MFP 100 regardless of the state of the relay server 300.

In addition, when requesting the relay server 300 to issue a token, the service providing server 200 transmits position information indicating the second reception port to the relay server 300. Therefore, it is not necessary to define a special command for setting the second reception port in the relay server 300, and communication for control can be simplified.

In addition, the service providing server 200 of the first modification transmits position information indicating the second reception port to the relay server 300 together with a predefined command to be transmitted to the relay server 300. Therefore, the token issued by the relay server 300 need not include the second reception port.

In the data processing system 1 of the second modification, the relay server 300 temporarily stores position information indicating the second reception port received together with the request for a token from the service providing server 200, and, in response to reception of a predetermined command using the token from the service providing server 200 after issuance of the token, transmits the temporarily stored position information of the second reception port to the MFP 100. Therefore, the relay server 300 can acquire the position information indicating the second reception port from the service providing server 200 without defining a special command, and can set the second reception port in the MFP 100.

In addition, the service providing server 200 of the third modification transmits position information indicating the second reception port to the relay server 300 when requesting the relay server 300 to issue a new token during a period in which a token issued by the relay server 300 in response to a request is valid. Therefore, it is not necessary to define a special command. Therefore, it is not necessary to define a special command for setting the second reception port in the relay server 300, and communication for control can be simplified. In addition, the relay server 300 may temporarily store position information indicating the second reception port received together with a request for a new token from the service providing server 200, and, in response to reception of a predetermined command using the token from the service providing server 200 after issuance of the new token, transmit the temporarily stored position information of the second reception port to the MFP 100.

In addition, the service providing server 200 confirms whether the relay server 300 can communicate, and when it is confirmed that the relay server 300 cannot communicate, the service providing server 200 receives data from the MFP 100 received via the second reception port, and processes the received data. Therefore, when the relay server 300 can communicate, data is received by the first reception port, so that data can be prevented from being received via the second reception port.

In addition, the MFP 100 of the fourth modification transmits all of generated data to the first transmission destination, but transmits a part of the generated data to the second transmission destination. Therefore, even when the amount of data receivable by the second reception port in the service providing server 200 is limited, since a part of the data is transmitted to the service providing server 200, the service providing server 200 can execute processing on the data.

In the data processing system of the present embodiment, the first reception port and the second reception port generated by the service providing server 200 correspond to a service provided by service providing server 200. Accordingly, when the service providing server 200 provides a plurality of services, a first reception port and a second reception port corresponding to each of the plurality of services are generated and set in the relay server 300 and the MFP 100. Also in a service provided by a server different from the service providing server 200, the other server may generate the first reception port and the second reception port. In this case, too, in the other server, a first reception port and a second reception port corresponding to the service provided by the server are generated and set in the relay server 300 and the MFP 100. In a case where the second reception port corresponding to the service provided by the server is not generated in the other server, the second reception port is not set in the MFP 100. Therefore, when the relay server 300 cannot communicate, the MFP 100 does not transmit data to the other server.

Summary of Embodiments (Item 1) A data processing system including a device to be managed, a relay device, and a management device that receives data generated by the device to be managed via the relay device, in which
the management device includes: a registration part that registers a set of the relay device and the device to be managed;
a preparation part that, in response to registration of the set of the relay device and the device to be managed, prepares a first reception port via the relay device and a second reception port not via the relay device as reception windows for data generated by the device to be managed;
a setting controller that controls the relay device to cause the device to be managed to set the second reception port; and,
a data processor that, in response to reception of data generated by the device to be managed via the first reception port or the second reception port, processes the data,
the relay device includes: a central processing unit (CPU) that, in response to reception of data generated by the device to be managed, transmits the data or data obtained by processing the data to the first reception port prepared by the management device for a set of the relay device and the device to be managed; and
a target controller that causes the management device to set the second reception port prepared by the management device for a set of the relay device and the device to be managed, and the device to be managed includes:
a first registration part that registers the relay device as a first transmission destination;
a second registration part that, in response to an instruction from the relay device to set the second reception port prepared by the management device for a set of the relay device and the device to be managed, registers the second reception port as a second transmission destination;
a data generator that generates data;

a first transmitter that transmits the generated data to the first transmission destination; and
a second transmitter that transmits the data to the second transmission destination when transmission of the data to the first transmission destination fails.

According to this aspect, when a set of the relay device and the device to be managed is registered in the management device, a first reception port via the relay device and a second reception port not via the relay device are prepared as reception windows for data generated by the device to be managed. In the relay device, the second reception port is set in the management device, and in response to reception of data generated in the device to be managed, the data is transmitted to the first reception port. In the device to be managed, the relay device is registered as the first transmission destination, and, in response to an instruction from the relay device to set the second reception port, the second reception port is registered as the second transmission destination. When transmission of data to the first transmission destination fails, the data is transmitted to the second transmission destination. Therefore, it is possible to provide a data processing system capable of receiving data from a device to be managed to a management device even if a relay device stops in a case where data is transmitted from the device to be managed to the management device via the relay device.

(Item 2) A management device including:
a registration part that registers a set of a relay device and a device to be managed;
a preparation part that, in response to registration of the set of the relay device and the device to be managed, prepares a first reception port via the relay device and a second reception port not via the relay device as reception windows for data generated by the device to be managed;
a setting controller that controls the relay device to cause the device to be managed to set the second reception port; and
a data processor that, in response to reception of data generated by the device to be managed via the first reception port or the second reception port, processes the data.

According to this aspect, in response to registration of a set of the relay device and the device to be managed, a first reception port via the relay device and a second reception port not via the relay device are prepared as reception windows for data generated by the device to be managed. Therefore, the data generated by the device to be managed can be received through either the route via the relay device or the route not via the relay device. Since the relay device is controlled such that the second reception port is set in the device to be managed, a route not via the relay device can be automatically set in the device to be managed. Therefore, it is possible to provide a management device capable of receiving data from a device to be managed even if a relay device stops in a case where data is received from the device to be managed via the relay device.

(Item 3) The management device according to item 2, in which the setting controller transmits position information indicating the second reception port to the relay device when requesting the relay device to issue a token.

According to this aspect, position information indicating the second reception port is transmitted to the relay device when requesting the relay device to issue a token. Therefore, it is not necessary to define a special command.

(Item 4) The management device according to item 2, in which the setting controller transmits position information indicating the second reception port to the relay device when requesting the relay device to issue a new token during a period in which a token issued by the relay device in response to a request is valid.

According to this aspect, position information indicating the second reception port is transmitted to the relay device when requesting the relay device to issue a new token during a period in which a token issued by the relay device in response to a request is valid. Therefore, it is not necessary to define a special command.

(Item 5) The management device according to item 2, in which the setting controller transmits position information indicating the second reception port to the relay device together with a predefined command to be transmitted to the relay device.

According to this aspect, position information indicating the second reception port is transmitted to the relay device together with a predefined command to be transmitted to the relay device. Therefore, it is not necessary to define a new command.

(Item 6) The management device according to any one of items 2 to 5 further including a confirmation part that confirms whether the relay device can communicate, in which the data processor processes data generated by the device to be managed received via the second reception port when the confirmation part confirms that the relay device cannot communicate.

According to this aspect, since data received via the second reception port is processed when the relay device cannot communicate, it is possible to prevent data from being received via the second reception port when the relay device can communicate.

(Item 7) A relay device that relays between a device to be managed and a management device that processes data generated by the device to be managed, the relay device including:

a central processing unit (CPU) that, in response to reception of data generated by the device to be managed, transmits the data or data obtained by processing the data to a first reception port prepared by the management device for a set of the relay device and the device to be managed; and a target controller that causes the device to be managed to set a second reception port prepared by the management device for a set of the relay device and the device to be managed.

According to this aspect, in response to reception of data generated by the device to be managed, the data or data obtained by processing the data is transmitted to the first reception port prepared by the management device for a set of the relay device and the device to be managed, so that data generated by the device to be managed can be transmitted to the management device. In addition, since the device to be managed is caused to set the second reception port prepared by the management device for a set of the relay device and the device to be managed, the device to be managed can transmit data generated by the device to be managed to the management device not via the relay device. Therefore, it is possible to provide a relay device capable of transmitting data from a device to be managed to a management device even when the relay device stops.

(Item 8) The relay device according to item 7, in which the target controller transmits, to the device to be managed, position information indicating the second reception port received together with a request for a token from the management device.

According to this aspect, for this reason, position information indicating the second reception port can be acquired by the relay device without defining a special command, and the second reception port can be set in the device to be managed.

(Item 9) The relay device according to item 7, in which the target controller temporarily stores position information indicating the second reception port received together with a request for a token from the management device, and, in response to reception of a predetermined command using the token from the management device after issuance of the token, transmits the temporarily stored position information indicating the second reception port to the device to be managed.

According to this aspect, for this reason, position information indicating the second reception port can be acquired by the relay device without defining a special command, and the second reception port can be set in the device to be managed.

(Item 10) The relay device according to item 7, in which when issuance of a new token is requested during a period in which a token issued for the management device is valid, the target controller transmits, to the device to be managed, position information indicating the second reception port received together with the request for issuance of the new token.

According to this aspect, position information indicating the second reception port can be acquired by the relay device without defining a special command, and the relay device can set the second reception port in the device to be managed.

(Item 11) The relay device according to item 10, in which the target controller temporarily stores position information indicating the second reception port received together with the request for the new token, and, in response to reception of a predetermined command using the new token from the management device after issuance of the new token, transmits the temporarily stored position information indicating the second reception port to the device to be managed.

According to this aspect, for this reason, position information indicating the second reception port can be acquired by the relay device without defining a special command, and the second reception port can be set in the device to be managed.

(Item 12) The relay device according to item 7, in which when the predefined command is received from the management device, the target controller transmits, to the device to be managed, position information indicating the second reception port received together with the command.

According to this aspect, position information indicating the second reception port can be acquired by the relay device without defining a special command, and the second reception port can be set in the device to be managed.

(Item 13) A device to be managed including:

a first registration part that registers a relay device as a first transmission destination;

second registration part that, in response to an instruction from the relay device to set a second reception port prepared by a management device for a set of the relay device and the device to be managed, registers the second reception port as a second transmission destination;

a data generator that generates data;

a first transmitter that transmits the generated data to the first transmission destination; and a second transmitter that transmits the data to the second transmission destination when transmission of the data to the first transmission destination fails.

According to this aspect, the relay device is registered as a first transmission destination, the second reception port is registered as a second transmission destination in response to an instruction from the relay device to set the second reception port prepared by the management device for the set of the relay device and the own device, and the data is transmitted to the second transmission destination when transmission of the data to the first transmission destination fails. Therefore, when data transmission to the management device via the relay device fails, the data is transmitted to the management device not via the relay device. Therefore, it is possible to provide a device to be managed capable of transmitting data to a management device even when a relay device stops.

(Item 14) The device to be managed according to item 13, in which the second transmitter transmits a part of the generated data to the second transmission destination.

According to this aspect, since a part of the data is transmitted to the management device, even when the amount of data to be transmitted to the second reception port is limited, the management device can execute processing on the data.

(Item 15) A data processing method for causing a management device to execute:
registering a set of a relay device and a device to be managed;
in response to registration of the set of the relay device and the device to be managed, preparing a first reception port via the relay device and a second reception port not via the relay device as reception windows for data generated by the device to be managed;
controlling the relay device to cause the device to be managed to set the second reception port; and,
in response to reception of data generated by the device to be managed via the first reception port or the second reception port, processing the data.

(Item 16) A data processing method executed by a relay device that relays between a device to be managed and a management device that processes data generated by the device to be managed, the data processing method causing the relay device to execute:
in response to reception of data generated by the device to be managed, transmitting the data or data obtained by processing the data to a first reception port prepared by the management device for a set of the relay device and the device to be managed; and
in response to an instruction from the management device to set a second reception port prepared by the management device for a set of the relay device and the device to be managed in the device to be managed, causing the device to be managed to set the second reception port.

(Item 17) A data processing method for causing a device to be managed to execute:
registering a relay device as a first transmission destination;
in response to an instruction from the relay device to set a second reception port prepared by a management device for a set of the relay device and the device to be managed, registering the second reception port as a second transmission destination;
generating data;
transmitting the generated data to the first transmission destination; and
transmitting the data to the second transmission destination when transmission of the data to the first transmission destination fails.

(Item 18) A data processing program causing a computer to perform:
registering a set of a relay device and a device to be managed;
in response to registration of the set of the relay device and the device to be managed, preparing a first reception port via the relay device and a second reception port not via the relay device as reception windows for data generated by the device to be managed;
controlling the relay device to cause the device to be managed to set the second reception port; and,
in response to reception of data generated by the device to be managed via the first reception port or the second reception port, processing the data.

(Item 19) A data processing program executed by a computer controlling a relay device that relays between a device to be managed and a management device that processes data generated by the device to be managed, the data processing program causing the computer to perform:
in response to reception of data generated by the device to be managed, transmitting the data or data obtained by processing the data to a first reception port prepared by the management device for a set of the relay device and the device to be managed; and
in response to an instruction from the management device to set a second reception port prepared by the management device for a set of the relay device and the device to be managed in the device to be managed, causing the device to be managed to set the second reception port.

(Item 20) A data processing program causing a computer to perform:
registering a relay device as a first transmission destination;
in response to an instruction from the relay device to set a second reception port prepared by a management device for a set of the relay device and a device to be managed, registering the second reception port as a second transmission destination;
generating data;
transmitting the generated data to the first transmission destination; and
transmitting the data to the second transmission destination when transmission of the data to the first transmission destination fails.

Although embodiments of the present invention have been described and illustrated in detail, the disclosed embodiments are made for purposes of illustration and example only and not limitation. The scope of the present invention should be interpreted by terms of the appended claims, and is intended to include all modifications within the meaning and scope equivalent to the claims

What is claimed is:

1. A data processing system comprising a device to be managed, a relay device, and a management device that receives data generated by the device to be managed via the relay device, wherein
the management device includes a first hardware processor that:
registers a set of the relay device and the device to be managed;
in response to registration of the set of the relay device and the device to be managed, prepares a first reception port via the relay device and a second reception port not via the relay device as reception windows for data generated by the device to be managed, wherein the first reception port and the second reception port are configured on the management device;

controls the relay device to cause the device to be managed to set the second reception port; and, in response to reception of data generated by the device to be managed via the first reception port or the second reception port, processes the data, the relay device includes a second hardware processor that:

in response to reception of data generated by the device to be managed, transmits the data or data obtained by processing the data to the first reception port prepared by the management device for a set of the relay device and the device to be managed; and causes the management device to set the second reception port prepared by the management device for a set of the relay device and the device to be managed, and the device to be managed includes a third hardware processor that:

registers the relay device as a first transmission destination;

in response to an instruction from the relay device to set the second reception port prepared by the management device for a set of the relay device and the device to be managed, registers the second reception port as a second transmission destination;

generates data;

transmits the generated data to the first transmission destination; and transmits the data to the second transmission destination when transmission of the data to the first transmission destination fails.

2. A management device comprising a first hardware processor that:

registers a set of a relay device and a device to be managed;

in response to registration of the set of the relay device and the device to be managed, prepares a first reception port via the relay device and a second reception port not via the relay device as reception windows for data generated by the device to be managed, the first reception port and the second reception port being configured on the management device;

controls the relay device to cause the device to be managed to set the second reception port; and in response to reception of data generated by the device to be managed via the first reception port or the second reception port, processes the data.

3. The management device according to claim 2, wherein the first hardware processor transmits position information indicating the second reception port to the relay device when requesting the relay device to issue a token.

4. The management device according to claim 2, wherein the first hardware processor transmits position information indicating the second reception port to the relay device when requesting the relay device to issue a new token during a period in which a token issued by the relay device in response to a request is valid.

5. The management device according to claim 2, wherein the first hardware processor transmits position information indicating the second reception port to the relay device together with a predefined command to be transmitted to the relay device.

6. The management device according to claim 2, wherein the first hardware processor further confirms whether the relay device can communicate, and processes data generated by the device to be managed received via the second reception port when confirming that the relay device cannot communicate.

7. A relay device that relays between a device to be managed and a management device that processes data generated by the device to be managed, the relay device comprising a second hardware processor that:

in response to reception of data generated by the device to be managed, transmits the data or data obtained by processing the data to a first reception port prepared by the management device for a set of the relay device and the device to be managed; and causes the device to be managed to set a second reception port prepared by the management device for a set of the relay device and the device to be managed, the first reception port and the second reception port are configured on the management device.

8. The relay device according to claim 7, wherein the second hardware processor transmits, to the device to be managed, position information indicating the second reception port received together with a request for a token from the management device.

9. The relay device according to claim 7, wherein the second hardware processor temporarily stores position information indicating the second reception port received together with a request for a token from the management device, and, in response to reception of a predetermined command using the token from the management device after issuance of the token, transmits the temporarily stored position information to the device to be managed.

10. The relay device according to claim 7, wherein when issuance of a new token is requested during a period in which a token issued for the management device is valid, the second hardware processor transmits, to the device to be managed, position information indicating the second reception port received together with the request for issuance of the new token.

11. The relay device according to claim 10, wherein the second hardware processor temporarily stores position information indicating the second reception port received together with the request for the new token, and, in response to reception of a predetermined command using the new token from the management device after issuance of the new token, transmits the temporarily stored position information to the device to be managed.

12. The relay device according to claim 7, wherein when the predefined command is received from the management device, the second hardware processor transmits, to the device to be managed, position information indicating the second reception port received together with the command.

13. A device to be managed comprising a third hardware processor that:

registers a relay device as a first transmission destination;

sets a first reception port prepared by a management device for the first transmission destination;

in response to an instruction from the relay device to set a second reception port prepared by the management device for a set of the relay device and the device to be managed, registers the second reception port as a second transmission destination, the second reception port and the first reception port being configured on the management device;

generates data;

transmits the generated data to the first transmission destination; and transmits the data to the second transmission destination when transmission of the data to the first transmission destination fails.

14. The device to be managed according to claim 13, wherein the third hardware processor transmits a part of the generated data to the second transmission destination.

15. A data processing method for causing a management device to execute:

registering a set of a relay device and a device to be managed;

in response to registration of the set of the relay device and the device to be managed, preparing a first reception port via the relay device and a second reception port not via the relay device as reception windows for data generated by the device to be managed, and wherein the first reception port and the second reception port are configured on the management device;

controlling the relay device to cause the device to be managed to set the second reception port; and, in response to reception of data generated by the device to be managed via the first reception port or the second reception port, processing the data.

16. A data processing method executed by a relay device that relays between a device to be managed and a management device that processes data generated by the device to be managed, the data processing method causing the relay device to execute:

in response to reception of data generated by the device to be managed, transmitting the data or data obtained by processing the data to a first reception port prepared by the management device for a set of the relay device and the device to be managed; and in response to an instruction from the management device to set a second reception port prepared by the management device for a set of the relay device and the device to be managed in the device to be managed, causing the device to be managed to set the second reception port, the first reception port and the second reception port being configured on the management device.

17. A data processing method for causing a device to be managed to execute:

registering a relay device as a first transmission destination;

setting a first reception port prepared by a management device for the first transmission destination;

in response to an instruction from the relay device to set a second reception port prepared by the management device for a set of the relay device and the device to be managed, registering the second reception port as a second transmission destination, the first reception port and the second reception port being configured on the management device;

generating data;

transmitting the generated data to the first transmission destination; and transmitting the data to the second transmission destination when transmission of the data to the first transmission destination fails.

18. A non-transitory recording medium storing a computer readable data processing program causing a computer to perform:

registering a set of a relay device and a device to be managed;

in response to registration of the set of the relay device and the device to be managed, preparing a first reception port via the relay device and a second reception port not via the relay device as reception windows for data generated by the device to be managed by a management device, the first reception port and the second reception port being configured on the management device;

controlling the relay device to cause the device to be managed to set the second reception port; and, in response to reception of data generated by the device to be managed via the first reception port or the second reception port, processing the data.

19. A non-transitory recording medium storing a computer readable data processing program executed by a computer controlling a relay device that relays between a device to be managed and a management device that processes data generated by the device to be managed, the data processing program causing the computer to perform:

in response to reception of data generated by the device to be managed, transmitting the data or data obtained by processing the data to a first reception port prepared by the management device for a set of the relay device and the device to be managed; and in response to an instruction from the management device to set a second reception port prepared by the management device for a set of the relay device and the device to be managed in the device to be managed, causing the device to be managed to set the second reception port, the first reception port and the second reception port being configured on the management device.

20. A non-transitory recording medium storing a computer readable data processing program causing a computer to perform:

registering a relay device as a first transmission destination;

setting a first reception port prepared by a management device for the first transmission destination;

in response to an instruction from the relay device to set a second reception port prepared by a management device for a set of the relay device and the management device, registering the second reception port as a second transmission destination, the first reception port and the second reception port being configured on the management device;

generating data;

transmitting the generated data to the first transmission destination; and transmitting the data to the second transmission destination when transmission of the data to the first transmission destination fails.

* * * * *